US012803646B2

(12) United States Patent
Luo et al.

(10) Patent No.: US 12,803,646 B2
(45) Date of Patent: Nov. 17, 2026

(54) SIGNAL SENDING METHOD, SIGNAL RECEIVING METHOD, AND COMMUNICATION APPARATUS

(71) Applicant: Huawei Technologies Co., Ltd., Shenzhen (CN)

(72) Inventors: Zhihu Luo, Beijing (CN); Jun Chen, Chengdu (CN); Yiling Wu, Beijing (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 18/902,066

(22) Filed: Sep. 30, 2024

(65) Prior Publication Data

US 2025/0023624 A1 Jan. 16, 2025

Related U.S. Application Data

(63) Continuation of application No. PCT/CN2023/081859, filed on Mar. 16, 2023.

(30) Foreign Application Priority Data

Apr. 2, 2022 (CN) ........................ 202210351628.0

(51) Int. Cl.
*H04B 7/12* (2006.01)
*H04B 1/10* (2006.01)

(52) U.S. Cl.
CPC ................ *H04B 7/12* (2013.01); *H04B 1/10* (2013.01)

(58) Field of Classification Search
CPC ............. H04B 1/10; H04B 7/12; H04B 1/04; H04B 1/1036; H04B 1/16; H04B 1/22; H03D 1/08
See application file for complete search history.

(56) References Cited

U.S. PATENT DOCUMENTS

| | | | | |
|---|---|---|---|---|
| 7,778,613 B2 * | 8/2010 | Seendripu | H04B 1/1036 455/313 |
| 8,903,347 B2 * | 12/2014 | Suominen | H04B 1/16 455/302 |

(Continued)

FOREIGN PATENT DOCUMENTS

| | | |
|---|---|---|
| JP | 2014179786 A | 9/2014 |
| JP | 2021087215 A | 6/2021 |

OTHER PUBLICATIONS

Xiongchuan Huang et al. An Interference Suppression Technique for RF Envelope Detection Transceivers, Apr. 23-24, 2015, total 5 pages.

*Primary Examiner* — Dac V Ha
(74) *Attorney, Agent, or Firm* — Slater Matsil, LLP

(57) ABSTRACT

A signal sending method, a signal receiving method, and a communication apparatus. A first device sends a first signal to a second device on a first frequency domain unit, and sends a second signal on a second frequency domain unit. The first frequency domain unit includes a first frequency, and the second frequency unit includes a second frequency. An absolute value of a difference between the first frequency and the second frequency is related to one or more of the following: a first bandwidth, a second bandwidth, or a third bandwidth. The first bandwidth is a bandwidth occupied by the first frequency domain unit in frequency domain. The second bandwidth is a bandwidth occupied by the second frequency domain unit in frequency domain. The third bandwidth is a bandwidth occupied by a third frequency domain unit in frequency domain.

18 Claims, 10 Drawing Sheets

(56) References Cited

U.S. PATENT DOCUMENTS

| | | | | |
|---|---|---|---|---|
| 12,588,045 | B2 * | 3/2026 | Duan | H04W 72/54 |
| 2002/0102951 | A1 | 8/2002 | Nakano et al. | |
| 2009/0110035 | A1 * | 4/2009 | Sutton | H04B 1/22<br>455/150.1 |
| 2010/0317299 | A1 * | 12/2010 | Shi | H04B 1/1036<br>455/73 |
| 2013/0143501 | A1 | 6/2013 | Huang et al. | |
| 2014/0003300 | A1 | 1/2014 | Weissman et al. | |
| 2015/0222308 | A1 * | 8/2015 | Huang | H04B 13/005<br>455/114.2 |
| 2020/0028637 | A1 | 1/2020 | Wolff et al. | |

* cited by examiner

SIGNAL SENDING METHOD, SIGNAL RECEIVING METHOD, AND COMMUNICATION APPARATUS

CROSS-REFERENCE TO RELATED APPLICATIONS

This application is a continuation of International Application No. PCT/CN2023/081859, filed on Mar. 16, 2023, which claims priority to Chinese Patent Application No. 202210351628.0, filed on Apr. 2, 2022. The disclosures of the aforementioned applications are hereby incorporated by reference in their entireties.

TECHNICAL FIELD

This application relates to the field of radio frequency technologies, and in particular, to a signal sending method, a signal receiving method, and a communication apparatus.

BACKGROUND

To further reduce power consumption of a receiver, a received signal may be processed through amplitude modulation and envelope detection, to avoid using a radio frequency module with high power. However, because the envelope detection is a non-linear component and has large noise, a radio frequency amplifier needs to be disposed before the envelope detector, to correctly demodulate the received signal. In addition, the receiver needs to filter the received signal. Therefore, a radio frequency filter needs to be disposed before the radio frequency amplifier, and a Q value of the radio frequency filter is required to be high, to achieve a good filtering effect. However, a Q value of an on-chip radio frequency filter is usually low. If the Q value of the on-chip radio frequency filter is expected to be high, a bulk acoustic wave (BAW) or a surface acoustic wave (SAW) needs to be externally connected. It is clear that an integration level of the receiver is low, and a requirement for a small receiver size cannot be satisfied.

SUMMARY

This application provides a signal sending method, a signal receiving method, and a communication apparatus, to reduce interference between signals without increasing complexity of a radio frequency filter in a receiver.

According to a first aspect, an embodiment of this application provides a signal sending method. The method may be performed by a first communication apparatus. The first communication apparatus may be a communication device or a communication apparatus, for example, a chip system, that can support the communication device in implementing a function required for the method. The following provides descriptions by using an example in which the communication device is a first device. For example, the first communication apparatus is a first device, a chip disposed in the first device, or another component configured to implement a function of the first device. The method includes: The first device determines a first signal and a second signal, sends the first signal to a second device on a first frequency domain unit, and sends the second signal on a second frequency domain unit. The first frequency domain unit includes a first frequency, and the second frequency unit includes a second frequency. An absolute value of a difference between the first frequency and the second frequency is related to one or more of the following: a first bandwidth, a second bandwidth, or a third bandwidth. The first bandwidth is a bandwidth occupied by the first frequency domain unit in frequency domain. The second bandwidth is a bandwidth occupied by the second frequency domain unit in frequency domain. The third bandwidth is a bandwidth occupied by a third frequency domain unit in frequency domain. The third frequency domain unit is used by the first device to send a third signal to a third device. The first signal, the second signal, and the third signal are in one operating band.

In this embodiment of this application, the first device that is used as a transmit end device may send two signals (for example, the first signal and the second signal) at two frequency positions (for example, the first frequency and the second frequency). For example, the first device may send the first signal at a first frequency position, and send the second signal at a second frequency position. For the second device that is used as a receive end, a radio frequency filter of the second device needs to enable the first signal and the second signal to pass through, in other words, a passband of the radio frequency filter needs to include the first frequency and the second frequency. It may be understood that a larger interval between the first frequency and the second frequency indicates a lower requirement on a Q value of the radio frequency filter of the second device, in other words, a radio frequency filter with a higher Q value is not required. Therefore, according to the method in this embodiment of this application, design and implementation complexity of the radio frequency filter may not be increased. In addition, considering existence of an interference signal, the second device may receive the first signal and the second signal through envelope detection. After envelope detection is performed, an intermediate-frequency component corresponding to the absolute value of the difference between the first frequency and the second frequency is a signal that the second device needs to obtain, and may also be referred to as a target signal. In this case, the second device may obtain the target signal by using an intermediate frequency bandpass filter, to suppress another frequency component that includes interference. It may be understood that, a frequency of an intermediate frequency is lower than a frequency of a radio frequency, and an intermediate frequency filter is easier to be designed and implemented under a same Q value requirement. Therefore, according to the solution in embodiments of this application, after envelope detection is performed, the second device may easily distinguish between the target signal and the interference by using the intermediate frequency filter, and the design and implementation complexity of the radio frequency filter is not increased.

In a possible implementation, the first device sends the first signal and the second signal within a frequency range corresponding to a channel bandwidth of the second device, and the absolute value of the difference between the first frequency and the second frequency is greater than or equal to ½ of the channel bandwidth of the second device. According to this solution, a frequency of an intermediate-frequency component (namely, a target signal) obtained by the second device by receiving the first signal and the second signal through envelope detection is different from a frequency of an interference signal. In other words, the target signal and the interference signal do not overlap in a spectrum, so that the interference signal can be easily filtered out by using an intermediate frequency filter. A requirement on a radio frequency filter is low, and design and implementation complexity of the radio frequency filter does not need to be increased.

In a possible implementation, the absolute value of the difference between the first frequency and the second frequency is greater than or equal to a sum of the third bandwidth and a fourth bandwidth. The fourth bandwidth is twice a sum of the first bandwidth and the second bandwidth, and the third signal falls between the first frequency and the second frequency in frequency domain. It may be understood that a larger difference between the first frequency and the second frequency indicates a larger difference between a frequency of a target signal and a frequency of an interference signal. According to this solution, the difference between the frequency of the target signal and the frequency of the interference signal is large, so that the interference signal and the target signal are easy to be distinguished, and the interference signal is easy to be filtered out by using an intermediate frequency filter. Therefore, a requirement on a radio frequency filter is lower, and design and implementation complexity of the radio frequency filter does not need to be increased.

In a possible implementation, the absolute value of the difference between the first frequency and the second frequency is a preset value. For example, the preset value is related to one or more of the following: the operating band, a subcarrier spacing of the first signal, or a subcarrier spacing of the second signal. The operating band is an operating band used for communication between the first device and the second device. Because the absolute value of the difference between the first frequency and the second frequency is the preset value, the method is applicable to a scenario in which the first device does not need to notify the second device of the absolute value of the difference between the first frequency and the second frequency. For example, after the first device establishes a communication connection to the second device, the first device sends first signaling between the first device and the second device to the second device by using the first frequency and the second frequency.

In a possible implementation, the method further includes: The first device sends first indication information to the second device. The first indication information indicates the absolute value of the difference between the first frequency and the second frequency. The first device may notify the second device of the absolute value of the difference between the first frequency and the second frequency, and this is flexible.

In a possible implementation, at most one of the first signal and the second signal is used to provide a carrier for uplink transmission of the second device. One signal is used to provide a carrier for transmission. It may also be considered that the signal is used for backscatter communication, and may be referred to as a carrier signal. Compared with the carrier signal, a data signal is a signal that carries modulation information. Both the first signal and the second signal may be data signals; or the first signal is a data signal, and the second signal is a carrier signal. It may be understood that, when the first signal is a data signal, and the second signal is a carrier signal, resource overheads of the first device can be reduced. When both the first signal and the second signal are data signals, data transmission reliability can be improved.

In a possible implementation, power of the first signal is the same as power of the second signal. Alternatively, power of the first signal may be different from power of the second signal. For example, the power of the first signal is the same as the power of the second signal, and neither the first signal nor the second signal may be a carrier signal, in other words, both the first signal and the second signal are data signals. For another example, the power of the first signal is greater than the power of the second signal, the first signal is a data signal, and the second signal is a carrier signal. Because the data signal carries useful information, data transmission reliability can be ensured by using high power. Relatively, because the second signal is carrier information and does not carry useful information, power consumption of the first device can be reduced by using low power. For example, neither the first signal nor the second signal is used to provide a carrier for uplink transmission of the second device, and the power of the first signal may be the same as the power of the second signal. For another example, one of the first signal and the second signal provides a carrier for uplink transmission of the second device, and the power of the first signal may be different from the power of the second signal. This can ensure data transmission reliability and reduce the power consumption of the first device.

In a possible implementation, at least one of the first signal and the second signal is in a guard band of one first carrier, and/or the absolute value of the difference between the first frequency and the second frequency is greater than or equal to a transmission bandwidth of one first carrier. The first carrier is a new radio (NR) carrier or a long term evolution (LTE) carrier. When both an operating band of the first device and an operating band of the second device are in an NR operating band, at least one of the first signal and the second signal is in a guard band of the NR carrier, so that impact on a transmission band of the NR carrier can be reduced.

In a possible implementation, both the first signal and the second signal are in a transmission bandwidth of a second carrier, a difference between a minimum value of the first frequency domain unit and a lowest frequency of the transmission bandwidth is less than or equal to a first value, and a difference between a maximum value of the second frequency domain unit and a highest frequency of the transmission bandwidth is less than or equal to a second value. The first value may be 0, and the second value may also be 0. When the first signal and the second signal are in a transmission bandwidth of an NR carrier, an operating band (namely, the first frequency domain unit) of the first signal and an operating band (namely, the second frequency domain unit) of the second signal may be respectively at two ends of the transmission bandwidth of the NR carrier, to ensure anti-interference performance of the first signal and the second signal as much as possible.

In a possible implementation, the method further includes: The first device sends second indication information to the second device. The second indication information indicates the second device to receive a signal in a first receiving manner or a second receiving manner. The first receiving manner indicates to receive a signal based on the absolute value of the difference between the first frequency and the second frequency. The second receiving manner indicates to receive a signal based on a frequency of a direct current carrier and the absolute value of the difference between the first frequency and the second frequency. It may be understood that the first device sends the first signal and the second signal. For the second device, if there is an interference signal, the second device may receive a signal at a frequency position corresponding to the absolute value of the difference between the first frequency and the second frequency. If there is no interference signal, in addition to receiving a signal at a frequency position corresponding to the absolute value of the difference between the first frequency and the second frequency, the second device may further receive a low-frequency signal near the direct current carrier. Therefore, the first device may notify the second device of a signal receiving manner, to ensure receiving performance of the second device as much as possible.

In a possible implementation, a modulation scheme of the first signal and/or a modulation scheme of the second signal are/is on-off keying (OOK), multicarrier on-off keying (MC-OOK), double-sideband amplitude-shift keying (DSB-ASK), single-sideband amplitude-shift keying (SSB-ASK), phase-reversal amplitude shift keying (PR-ASK), multiple amplitude-shift keying (MASK), frequency-shift keying (FSK), gauss frequency-shift keying (GFSK), multiple frequency-shift keying (MFSK), binary phase shift keying (BPSK), quadrature phase shift keying (QPSK), pulse amplitude modulation (PAM), pulse-width modulation (PWM), pulse position modulation (PPM), pulse density modulation (PDM), or pulse-code modulation (PCM)

In a possible implementation, a modulation scheme of the first signal is the same as a modulation scheme of the second signal.

In a possible implementation, a modulation scheme of the first signal is different from a modulation scheme of the second signal.

In a possible implementation, the first signal or the second signal is a single carrier signal; or the first signal or the second signal occupies one subcarrier in frequency domain; or the first signal or the second signal is a signal including one subcarrier that carries energy.

In a possible implementation, the first signal and/or the second signal are/is multicarrier signals/a multicarrier signal; or the first signal and/or the second signal occupy/occupies a plurality of subcarriers in frequency domain; or the first signal and/or the second signal are/is signals or a signal including a plurality of subcarriers that carry energy.

In a possible implementation, an antenna port of the first signal is the same as an antenna port of the second signal.

In a possible implementation, a cyclic prefix length of the first signal is the same as a cyclic prefix length of the second signal.

In a possible implementation, a subcarrier spacing of the first signal is the same as a subcarrier spacing of the second signal.

In a possible implementation, a waveform of the first signal and/or a waveform of the second signal are/is orthogonal frequency division multiplexing (OFDM) using a cyclic prefix (CP).

In a possible implementation, a waveform of the first signal and/or a waveform of the second signal are/is OFDM using a CP, and discrete Fourier transform (DFT) spreading is performed.

According to a second aspect, an embodiment of this application provides a signal receiving method. The method may be performed by a second communication apparatus. The second communication apparatus may be a communication device or a communication apparatus, for example, a chip system, that can support the communication device in implementing a function required for the method. The following provides descriptions by using an example in which the communication device is a second device. For example, the second communication apparatus is a second device, a chip disposed in the second device, or another component configured to implement a function of the second device. The method includes:

The second device receives a first signal and a second signal through envelope detection, and obtains a target signal. The first signal and the second signal are in one operating band. A frequency that carries the target signal includes an absolute value of a difference between a first frequency that carries the first signal and a second frequency that carries the second signal.

In a possible implementation, the frequency that carries the target signal further includes a frequency of a direct current carrier.

In a possible implementation, before the second device obtains the target signal, the method further includes: The second device determines a receiving manner used to obtain the target signal. The receiving manner includes a first receiving manner or a second receiving manner. The first receiving manner indicates to receive a signal based on the absolute value of the difference between the first frequency and the second frequency. The second receiving manner indicates to receive a signal based on the frequency of the direct current carrier and the absolute value of the difference between the first frequency and the second frequency.

In a possible implementation, that the second device determines the first receiving manner or the second receiving manner includes: The second device receives second indication information sent by a first device. The second indication information indicates the first receiving manner or the second receiving manner.

In a possible implementation, the absolute value of the difference between the first frequency and the second frequency is related to one or more of the following: a first bandwidth, a second bandwidth, or a third bandwidth. The first bandwidth is a bandwidth occupied by a first frequency domain unit in frequency domain, and the first frequency domain unit includes the first frequency. The second bandwidth is a bandwidth occupied by a second frequency domain in frequency domain, and the second frequency domain unit includes the second frequency. The third bandwidth is a bandwidth occupied by a third frequency domain unit in frequency domain, the third frequency domain unit is used by the first device to send a third signal to a third device, and the third signal is in the operating band.

In a possible implementation, the first signal and the second signal are sent within a frequency range corresponding to a channel bandwidth of the second device. The absolute value of the difference between the first frequency and the second frequency is greater than or equal to ½ of the channel bandwidth of the second device.

In a possible implementation, the absolute value of the difference between the first frequency and the second frequency is greater than or equal to a sum of the third bandwidth and a fourth bandwidth. The fourth bandwidth is twice a sum of the first bandwidth and the second bandwidth. The third signal falls between the first frequency and the second frequency in frequency domain.

In a possible implementation, the absolute value of the difference between the first frequency and the second frequency is a preset value. The preset value is related to one or more of the following: the operating band, a subcarrier spacing of the first signal, or a subcarrier spacing of the second signal.

In a possible implementation, the method further includes: The second device receives first indication information sent by the first device. The first indication information indicates the absolute value.

In a possible implementation, at most one of the first signal and the second signal is used to provide a carrier for uplink transmission of the second device.

In a possible implementation, power of the first signal is the same as power of the second signal.

In a possible implementation, the power of the first signal is the same as the power of the second signal, and neither the first signal nor the second signal is used to provide a carrier for uplink transmission of the second device.

In a possible implementation, at least one of the first signal and the second signal is in a guard band of one first carrier, and/or the absolute value of the difference between the first frequency and the second frequency is greater than or equal to a transmission bandwidth of one first carrier. The first carrier is a new radio NR carrier or an LTE carrier.

In a possible implementation, both the first signal and the second signal are in a transmission bandwidth of a second carrier, a difference between a minimum value of the first frequency unit and a lowest frequency of the transmission bandwidth is less than a first value, and a difference between a maximum value of the second frequency domain unit and a highest frequency of the transmission bandwidth is less than a second value.

In a possible implementation, a modulation scheme of the first signal and/or a modulation scheme of the second signal are/is OOK, MC-OOK, DSB-ASK, SSB-ASK, PR-ASK, MASK, FSK, GFSK, MFSK, BPSK, QPSK, PAM, PWM, PPM, PDM, or PCM.

In a possible implementation, a modulation scheme of the first signal is the same as a modulation scheme of the second signal.

In a possible implementation, a modulation scheme of the first signal is different from a modulation scheme of the second signal.

In a possible implementation, the first signal or the second signal is a single carrier signal; or the first signal or the second signal occupies one subcarrier in frequency domain; or the first signal or the second signal is a signal including one subcarrier that carries energy.

In a possible implementation, the first signal and/or the second signal are/is multicarrier signals/a multicarrier signal; or the first signal and/or the second signal occupy/occupies a plurality of subcarriers in frequency domain; or the first signal and/or the second signal are/is signals or a signal including a plurality of subcarriers that carry energy.

In a possible implementation, an antenna port of the first signal is the same as an antenna port of the second signal.

In a possible implementation, a cyclic prefix length of the first signal is the same as a cyclic prefix length of the second signal.

In a possible implementation, a subcarrier spacing of the first signal is the same as a subcarrier spacing of the second signal.

In a possible implementation, a waveform of the first signal and/or a waveform of the second signal are/is OFDM using a CP.

In a possible implementation, a waveform of the first signal and/or a waveform of the second signal are/is OFDM using a CP, and DFT spreading is performed.

For technical effects brought by the second aspect and the possible implementations of the second aspect, refer to the descriptions of the technical effects of the first aspect and the implementations of the first aspect.

According to a third aspect, an embodiment of this application provides a signal sending method. The method may be performed by a first communication apparatus. The first communication apparatus may be a communication device or a communication apparatus, for example, a chip system, that can support the communication device in implementing a function required for the method. The following provides descriptions by using an example in which the communication device is a first device. For example, the first communication apparatus is a first device, a chip disposed in the first device, or another component configured to implement a function of the first device. The method includes:

The first device determines a first signal and a second signal, sends the first signal to a second device on a first frequency domain unit, and sends the second signal on a second frequency domain unit. The first signal and the second signal are in a same operating band. The first frequency domain unit includes a first frequency, and the second frequency domain unit includes a second frequency. An absolute value of a difference between the first frequency and the second frequency is a preset value. Alternatively, the first device further sends an absolute value of a difference between the first frequency and the second frequency to the second device.

In a possible implementation, that the first device sends the absolute value of the difference between the first frequency and the second frequency to the second device includes: The first device sends indication information to the second device. The indication information indicates the absolute value of the difference between the first frequency and the second frequency.

In a possible implementation, the absolute value of the difference between the first frequency and the second frequency is a preset value. The preset value is related to one or more of the following: the operating band, a subcarrier spacing of the first signal, or a subcarrier spacing of the second signal.

In a possible implementation, the first signal and the second signal are sent within a frequency range corresponding to a channel bandwidth of the second device. The absolute value of the difference between the first frequency and the second frequency is greater than or equal to ½ of the channel bandwidth of the second device.

In a possible implementation, the absolute value of the difference between the first frequency and the second frequency is greater than or equal to a sum of a third bandwidth and a fourth bandwidth. The fourth bandwidth is twice a sum of a first bandwidth and a second bandwidth. The third bandwidth is a bandwidth occupied by a third frequency domain unit in frequency domain. The third frequency domain unit is used by the first device to send a third signal to a third device. The third signal falls between the first frequency and the second frequency in frequency domain.

In a possible implementation, at most one of the first signal and the second signal is used to provide a carrier for uplink transmission of the second device.

In a possible implementation, power of the first signal is the same as power of the second signal.

In a possible implementation, the power of the first signal is the same as the power of the second signal, and neither the first signal nor the second signal is used to provide a carrier for uplink transmission of the second device.

In a possible implementation, at least one of the first signal and the second signal is in a guard band of one first carrier, and/or the absolute value of the difference between the first frequency and the second frequency is greater than or equal to a transmission bandwidth of one first carrier. The first carrier is a new radio NR carrier or an LTE carrier.

In a possible implementation, both the first signal and the second signal are in a transmission bandwidth of a second carrier, a difference between a minimum value of the first frequency unit and a lowest frequency of the transmission bandwidth is less than a first value, and a difference between a maximum value of the second frequency domain unit and a highest frequency of the transmission bandwidth is less than a second value.

In a possible implementation, the method further includes: The first device sends second indication information to the second device. The second indication information indicates the second device to receive a signal in a first receiving manner or a second receiving manner. The first receiving manner indicates to receive a signal based on the absolute value of the difference between the first frequency and the second frequency. The second receiving manner indicates to receive a signal based on a frequency of a direct current carrier and the absolute value of the difference between the first frequency and the second frequency.

According to a fourth aspect, an embodiment of this application provides a signal receiving method. The method may be performed by a second communication apparatus. The second communication apparatus may be a communication device or a communication apparatus, for example, a chip system, that can support the communication device in implementing a function required for the method. The following provides descriptions by using an example in which the communication device is a second device. For example, the second communication apparatus is a second device, a chip disposed in a second device, or another component configured to implement a function of the second device. The method includes:

The second device receives a first signal and a second signal through envelope detection. The first signal and the second signal are in one operating band. The second device obtains a target signal. A frequency that carries the target signal includes an absolute value of a difference between a first frequency that carries the first signal and a second frequency that carries the second signal. The absolute value of the difference between the first frequency and the second frequency is a preset value, or the absolute value of the difference between the first frequency and the second frequency is obtained from the first device.

In a possible implementation, the method further includes: The second device receives first indication information sent by the first device. The first indication information indicates the absolute value.

In a possible implementation, the frequency that carries the target signal further includes a frequency of a direct current carrier.

In a possible implementation, before the second device obtains the target signal, the method further includes: The second device determines a receiving manner used to obtain the target signal. The receiving manner includes a first receiving manner or a second receiving manner. The first receiving manner indicates to receive a signal based on the absolute value of the difference between the first frequency and the second frequency. The second receiving manner indicates to receive a signal based on the frequency of the direct current carrier and the absolute value of the difference between the first frequency and the second frequency.

In a possible implementation, that the second device determines the first receiving manner or the second receiving manner includes: The second device receives second indication information sent by the first device. The second indication information indicates the first receiving manner or the second receiving manner.

In a possible implementation, the absolute value of the difference between the first frequency and the second frequency is related to one or more of the following: a first bandwidth, a second bandwidth, or a third bandwidth. The first bandwidth is a bandwidth occupied by a first frequency domain unit in frequency domain, and the first frequency domain unit includes the first frequency. The second bandwidth is a bandwidth occupied by a second frequency domain in frequency domain, and the second frequency domain unit includes the second frequency. The third bandwidth is a bandwidth occupied by a third frequency domain unit in frequency domain, the third frequency domain unit is used by the first device to send a third signal to a third device, and the third signal is in the operating band.

In a possible implementation, the first signal and the second signal are sent within a frequency range corresponding to a channel bandwidth of the second device. The absolute value of the difference between the first frequency and the second frequency is greater than or equal to ½ of the channel bandwidth of the second device.

In a possible implementation, the absolute value of the difference between the first frequency and the second frequency is greater than or equal to a sum of the third bandwidth and a fourth bandwidth. The fourth bandwidth is twice a sum of the first bandwidth and the second bandwidth. The third signal falls between the first frequency and the second frequency in frequency domain.

In a possible implementation, the absolute value of the difference between the first frequency and the second frequency is a preset value. The preset value is related to one or more of the following: the operating band, a subcarrier spacing of the first signal, or a subcarrier spacing of the second signal.

In a possible implementation, the method further includes: The second device receives first indication information sent by the first device. The first indication information indicates the absolute value.

In a possible implementation, at most one of the first signal and the second signal is used to provide a carrier for uplink transmission of the second device.

In a possible implementation, power of the first signal is the same as power of the second signal.

In a possible implementation, the power of the first signal is the same as the power of the second signal, and neither the first signal nor the second signal is used to provide a carrier for uplink transmission of the second device.

In a possible implementation, at least one of the first signal and the second signal is in a guard band of one first carrier, and/or the absolute value of the difference between the first frequency and the second frequency is greater than or equal to a transmission bandwidth of one first carrier. The first carrier is a new radio NR carrier or an LTE carrier.

In a possible implementation, both the first signal and the second signal are in a transmission bandwidth of a second carrier, a difference between a minimum value of the first frequency unit and a lowest frequency of the transmission bandwidth is less than a first value, and a difference between a maximum value of the second frequency domain unit and a highest frequency of the transmission bandwidth is less than a second value.

According to a fifth aspect, an embodiment of this application provides a communication apparatus. The communication apparatus has a function of implementing behavior in the method embodiment of the first aspect. For beneficial effects, refer to the descriptions of the first aspect. Details are not described herein again. The communication apparatus may be the first device in the first aspect, or the communication apparatus may be an apparatus, for example, a chip or a chip system that can implement the method provided in the first aspect.

In a possible design, the communication apparatus includes a corresponding means (means) or module configured to perform the method according to the first aspect. For example, the communication apparatus includes a processing unit (sometimes also referred to as a processing module or a processor) and/or a transceiver unit (sometimes also referred to as a transceiver module or a transceiver). These units (modules) may perform corresponding functions in the method example in the first aspect.

For example, the processing module may be configured to determine a first signal and a second signal. The transceiver module may be configured to: send the first signal to a second device on a first frequency domain unit, and send the second signal on a second frequency domain unit. The first frequency domain unit includes a first frequency, and the second frequency unit includes a second frequency. An absolute value of a difference between the first frequency and the second frequency is related to one or more of the following: a first bandwidth, a second bandwidth, or a third bandwidth. The first bandwidth is a bandwidth occupied by the first frequency domain unit in frequency domain. The second bandwidth is a bandwidth occupied by the second frequency domain unit in frequency domain. The third bandwidth is a bandwidth occupied by a third frequency domain unit in frequency domain. The third frequency domain unit is used by the first device to send a third signal to a third device. The first signal, the second signal, and the third signal are in one operating band. For details, refer to detailed descriptions in the method example. Details are not described herein.

According to a sixth aspect, an embodiment of this application provides a communication apparatus. The communication apparatus has a function of implementing behavior in the method embodiment of the second aspect. For beneficial effects, refer to the descriptions of the second aspect. Details are not described herein again. The communication apparatus may be the second device in the second aspect, or the communication apparatus may be an apparatus, for example, a chip or a chip system that can implement the method provided in the second aspect.

In a possible design, the communication apparatus includes a corresponding means (means) or module configured to perform the method according to the second aspect. For example, the communication apparatus includes a processing unit (sometimes also referred to as a processing module or a processor) and/or a transceiver unit (sometimes also referred to as a transceiver module or a transceiver). These units (modules) may perform corresponding functions in the method example in the second aspect.

For example, the transceiver module receives a first signal and a second signal through envelope detection, and the first signal and the second signal are in one operating band. The processing module is configured to obtain a target signal. A frequency that carries the target signal includes an absolute value of a difference between a first frequency that carries the first signal and a second frequency that carries the second signal. For details, refer to detailed descriptions in the method example. Details are not described herein.

According to a seventh aspect, an embodiment of this application provides a communication apparatus. The communication apparatus has a function of implementing behavior in the method embodiment of the third aspect. For beneficial effects, refer to the descriptions of the third aspect. Details are not described herein again. The communication apparatus may be the first device in the third aspect, or the communication apparatus may be an apparatus, for example, a chip or a chip system that can implement the method provided in the third aspect.

In a possible design, the communication apparatus includes a corresponding means (means) or module configured to perform the method according to the third aspect. For example, the communication apparatus includes a processing unit (sometimes also referred to as a processing module or a processor) and/or a transceiver unit (sometimes also referred to as a transceiver module or a transceiver). These units (modules) may perform corresponding functions in the method example in the third aspect.

For example, the processing module may be configured to determine a first signal and a second signal. The transceiver module may be configured to: send the first signal to a second device on a first frequency domain unit, and send the second signal on a second frequency domain unit. The first frequency domain unit includes a first frequency, and the second frequency unit includes a second frequency. An absolute value of a difference between the first frequency and the second frequency is related to one or more of the following: a first bandwidth, a second bandwidth, or a third bandwidth. The first bandwidth is a bandwidth occupied by the first frequency domain unit in frequency domain. The second bandwidth is a bandwidth occupied by the second frequency domain unit in frequency domain. The third bandwidth is a bandwidth occupied by a third frequency domain unit in frequency domain. The third frequency domain unit is used by the first device to send a third signal to a third device. The first signal, the second signal, and the third signal are in one operating band. For details, refer to detailed descriptions in the method example. Details are not described herein.

According to an eighth aspect, an embodiment of this application provides a communication apparatus. The communication apparatus has a function of implementing behavior in the method embodiment of the fourth aspect. For beneficial effects, refer to the descriptions of the fourth aspect. Details are not described herein again. The communication apparatus may be the second device in the fourth aspect, or the communication apparatus may be an apparatus, for example, a chip or a chip system that can implement the method provided in the fourth aspect.

In a possible design, the communication apparatus includes a corresponding means (means) or module configured to perform the method according to the fourth aspect. For example, the communication apparatus includes a processing unit (sometimes also referred to as a processing module or a processor) and/or a transceiver unit (sometimes also referred to as a transceiver module or a transceiver). These units (modules) may perform corresponding functions in the method example in the fourth aspect.

For example, the transceiver module receives a first signal and a second signal through envelope detection, and the first signal and the second signal are in one operating band. The processing module is configured to obtain a target signal. A frequency that carries the target signal includes an absolute value of a difference between a first frequency that carries the first signal and a second frequency that carries the second signal. For details, refer to detailed descriptions in the method example. Details are not described herein.

According to a ninth aspect, an embodiment of this application provides a communication apparatus. The communication apparatus may be the communication apparatus in any one of the first aspect to the fourth aspect in the foregoing embodiments, or may be a chip or a chip system disposed in the communication apparatus in any one of the first aspect to the fourth aspect. The communication apparatus includes a communication interface and a processor, and optionally, further includes a memory. The memory is configured to store a computer program. The processor is coupled to the memory and the communication interface. When the processor reads the computer program or instructions, the communication apparatus performs the method performed by the first device or the second device in the foregoing method embodiment.

The communication interface in the communication apparatus in the ninth aspect may be a transceiver in the communication apparatus, for example, implemented by using an antenna, a feeder, a codec, and the like in the communication apparatus. Alternatively, if the communication apparatus is a chip disposed in the communication apparatus, the communication interface may be an input/output interface of the chip, for example, an input/output pin.

According to a tenth aspect, an embodiment of this application provides a communication apparatus. The communication apparatus includes an input/output interface and a logic circuit. The input/output interface is configured to input and/or output information. The logic circuit is configured to perform the method according to any one of the first aspect to the fourth aspect.

According to an eleventh aspect, an embodiment of this application provides a chip system. The chip system includes a processor and may further include a memory and/or a communication interface, and is configured to implement the method according to any one of the first aspect to the fourth aspect. In a possible implementation, the chip system further includes a memory, configured to store a computer program. The chip system may include a chip, or may include a chip and another discrete component.

According to a twelfth aspect, an embodiment of this application provides a communication system. The communication system includes a first device and a second device. The first device is configured to perform the method performed by the first device in the first aspect, and the second device is configured to perform the method performed by the second device in the second aspect. Alternatively, the first device is configured to perform the method performed by the first device in the third aspect, and the second device is configured to perform the method performed by the second device in the fourth aspect. Alternatively, the communication system may further include more first devices and/or more second devices.

According to a thirteen aspect, this application provides a computer-readable storage medium. The computer-readable storage medium stores a computer program. When the computer program is run, the method according to any one of the first aspect to the fourth aspect is implemented.

According to a fourteenth aspect, a computer program product is provided. The computer program product includes computer program code. When the computer program code is run, the method according to any one of the first aspect to the fourth aspect is performed.

For beneficial effects of the fifth aspect to the fourteenth aspect and implementations thereof, refer to the descriptions of beneficial effects of the methods according to the first aspect to the fourth aspect and implementations thereof.

DETAILED DESCRIPTION OF ILLUSTRATIVE EMBODIMENTS

The technical solutions provided in embodiments of this application may be applied to a 5G mobile communication system, for example, an NR system, or applied to an LTE system, or may be further applied to a next generation mobile communication system or another similar communication system. The technical solutions provided in embodiments of this application may alternatively be applied to an internet of things (IoT) system, a narrowband internet of things (NB-IoT) system, or the like, for example, wireless fidelity (Wi-Fi)-based IoT or a wearable Wi-Fi network. The wearable Wi-Fi network may be a Wi-Fi network that includes an associated wearable device and a terminal device (for example, a mobile phone) that is used as a virtual access point. An internet of things device and a wearable Wi-Fi network device are powered by a small-capacity battery, and have requirements of ultra-low power consumption and long battery endurance. The internet of things device includes, for example, a smart water meter, a smart home, and an industrial sensor.

Figure 1:
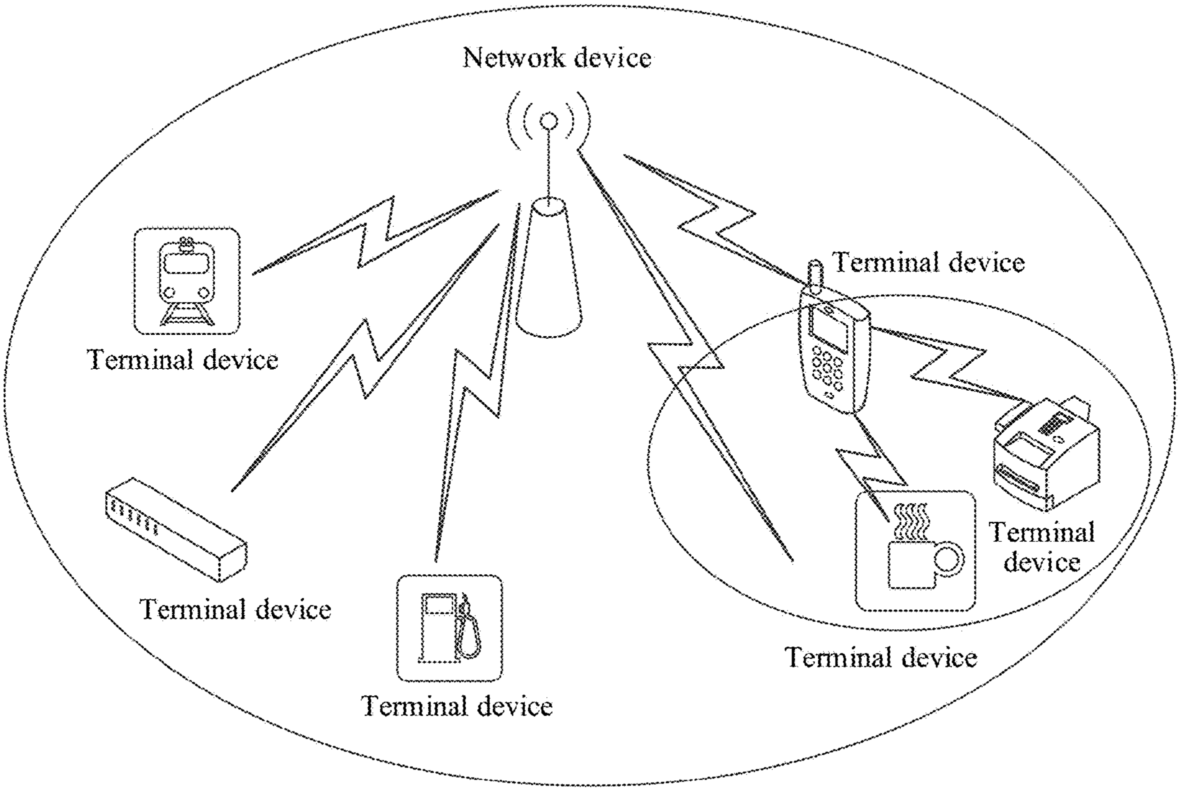
FIG. 1 is a diagram of a network architecture to which an embodiment of this application is applicable.

FIG. 1 is a diagram of an example architecture of a communication system to which an embodiment of this application is applicable. The communication system may include a network device and six terminal devices. The six terminal devices may each be a cellular phone, a smartphone, a portable computer, a handheld communication device, a handheld computing device, a satellite radio apparatus, a global positioning system, a personal digital assistant (PDA), and/or any other suitable device configured to perform communication in a wireless communication system, and may all be connected to the network device. All the six terminal devices can communicate with the network device. Certainly, a quantity of terminal devices in FIG. 1 is merely an example. There may further be fewer or more terminal devices. In addition, the terminal device in FIG. 1 is also an example. For example, the terminal device may alternatively be an internet of things device such as a smart water meter.

In this embodiment of this application, the network device is an access device that is used by the terminal device to access a mobile communication system in a wireless manner, for example, includes an access network (AN) device, for example, a base station. The network device may alternatively be a device that communicates with the terminal device over an air interface. The network device may include an evolved NodeB (also referred to as an eNB or an e-NodeB for short) in an LTE system or a long term evolution-advanced (LTE-A) system. The network device may alternatively include a next generation NodeB (gNB) in a 5G NR system. Alternatively, the network device may include an access node in a wireless fidelity (Wi-Fi) system. Alternatively, the network device may be a relay station, a vehicle-mounted device, a future evolved public land mobile network (PLMN) device, a device in a D2D network, a device in a machine-to-machine (M2M) network, a device in an internet of things (IoT) network, a network device in a PLMN network, or the like. A specific technology and a specific device form that are used by the network device are not limited in embodiments of this application.

In addition, a base station in embodiments of this application may include a central unit (CU) and a distributed unit (DU), and a plurality of DUs may be centrally controlled by one CU. The CU and the DU may be divided based on a protocol layer function that the CU and the DU each have in a wireless network. For example, functions of a packet data convergence protocol (PDCP) layer and a protocol layer above the packet data convergence protocol layer are set on the CU, and functions of protocol layers below the PDCP layer, for example, a radio link control (RLC) layer and a medium access control (MAC) layer, are set on the DU. It should be noted that such protocol layer division is merely an example, and there may be division of another protocol layer. A radio frequency apparatus may be remotely deployed and not placed in the DU, or may be integrated into the DU, or may be partially remotely disposed and partially integrated into the DU. This is not limited in embodiments of this application. In addition, in some embodiments, a control plane (CP) and a user plane (UP) of the CU may be separated and divided into different entities for implementation. The different entities are respectively a control plane CU entity (CU-CP entity) and a user plane CU entity (CU-UP entity). In this network architecture, signaling generated by the CU may be sent to the terminal device through the DU, or signaling generated by UE may be sent to the CU through the DU. The DU may transparently transmit the signaling to the UE or the CU by directly encapsulating the signaling at a protocol layer without parsing the signaling. In this network architecture, the CU is classified as a network device on a radio access network (RAN) side. In addition, the CU may alternatively be classified as a network device on a core network (CN) side. This is not limited in this application.

Alternatively, the access network device may be a server or the like. For example, a network device in a vehicle-to-everything (V2X) technology may be a roadside unit (RSU). The following provides descriptions by using an example in which the access network device is a base station. The base station may communicate with the terminal device, or may communicate with the terminal device via a relay station. The terminal device may communicate with a plurality of base stations in different access technologies.

In embodiments of this application, the terminal device is a device having a wireless transceiver function, and may send a signal to the network device, or receive a signal from the network device. The terminal device may include user equipment (UE), and sometimes may also be referred to as a terminal, an access station, a UE station, a remote station, a wireless communication device, a user apparatus, or the like. The terminal device is configured to connect persons, objects, machines, and the like, and may be widely used in various scenarios, for example, including but not limited to the following scenarios: cellular communication, D2D, V2X, machine-to-machine/machine-type communication (M2M/MTC), internet of things (IoT), virtual reality (VR), augmented reality (AR), industrial control, self driving, telemedicine, a smart grid, smart furniture, a smart office, a smart wearable, smart transportation, a smart city, an uncrewed aerial vehicle, a robot, and the like. For example, the terminal device may be a mobile phone, a tablet, a computer with a wireless transceiver function, a VR terminal, an AR terminal, a wireless terminal in industrial control, a wireless terminal in self driving, a smart speaker in an IoT network, a wireless terminal device in the telemedicine, a wireless terminal device in the smart grid, a wireless terminal device in transportation security, a wireless terminal device in the smart city, a wireless terminal device in the smart home, or the like.

By way of example but not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs). The terminal device in this application may alternatively be a vehicle-mounted module, a vehicle-mounted assembly, a vehicle-mounted component, a vehicle-mounted chip, or a vehicle-mounted unit that is built in a vehicle as one or more components or units. The vehicle uses the vehicle-mounted module, the vehicle-mounted assembly, the vehicle-mounted component, the vehicle-mounted chip, or the vehicle-mounted unit that is built in the vehicle to implement a method in this application.

In embodiments of this application, a communication apparatus configured to implement a function of the network device may be a network device, or may be an apparatus, for example, a chip system, that can support the network device in implementing the function. The apparatus may be installed in the network device. In the technical solutions provided in embodiments of this application, an example in which the apparatus configured to implement the function of the network device is a network device is used to describe the technical solutions provided in embodiments of this application.

The following explains and describes some terms in embodiments of this application.

(1) Channel bandwidth: The UE channel bandwidth supports a single NR radio frequency carrier in the uplink or downlink at the UE. From a base station perspective, different UE channel bandwidths may be supported within the same spectrum for transmitting to and receiving from UEs connected to the base station. Transmission of multiple carriers to the same UE (carrier) or multiple carriers to different UEs within the base station channel bandwidth can be supported. From a UE perspective, the UE may be configured with one or more bandwidth parts (BWP)/carriers, each with its own UE channel bandwidth. The UE does not need to be aware of the base station channel bandwidth or how the base station allocates bandwidth to different UEs.

Figure 13:
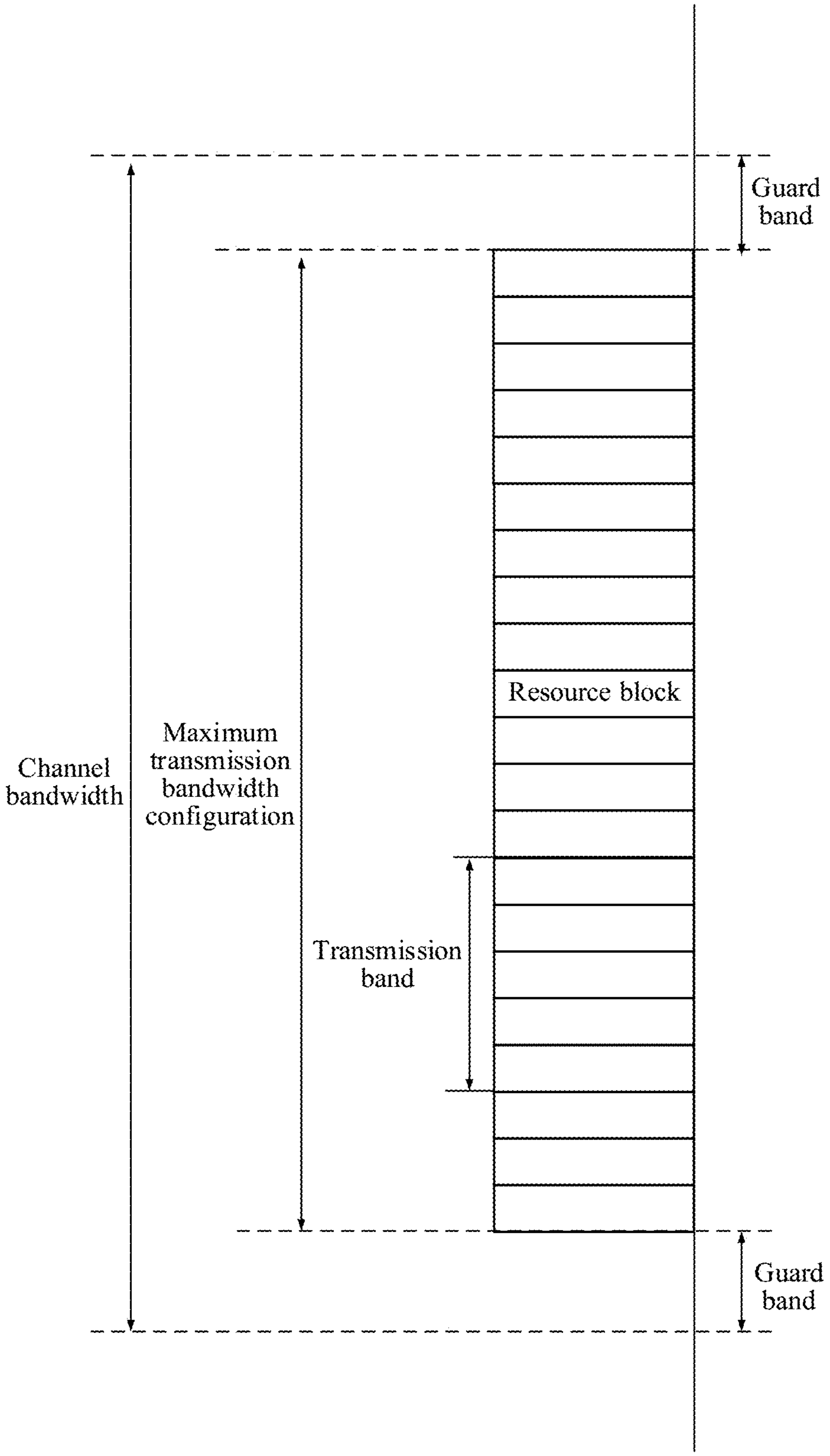
FIG. 13 is a diagram of a relationship between a channel bandwidth, a transmission band, and a guardband.

A UE channel bandwidth of each UE carrier is flexibly configured, but can only be completely within the channel bandwidth of the base station. For example, a relationship between a channel bandwidth, a guard band, and a maximum transmission bandwidth configuration is shown in FIG. 13.

(2) Operating band: The operating band is a frequency band supported by a device, for example, 900 MHz and 1.8 GHz. One operating band may include a plurality of carriers, and one carrier may include one transmission band and at least two guard bands. The transmission band may be used by the device to transmit a signal.

(3) Frequency domain unit: The frequency domain unit is a segment of contiguous frequency domain resources in frequency domain. For example, one transmission band may include a plurality of frequency domain units.

(4) Carrier signal: The carrier signal may be used for backscatter communication, and may provide a carrier for uplink transmission of a receiving device, or may provide energy for the receiving device. Compared with the carrier signal, there is a data signal. The data signal may be considered as a signal that carries modulation information. In embodiments of this application, a waveform corresponding to the carrier signal may be a sine wave or a cosine wave at a given frequency, or amplitude and/or phase modulation is not performed on the waveform corresponding to the carrier signal. Alternatively, amplitude and/or phase modulation is performed on a waveform corresponding to the carrier signal, but an overall amplitude is insufficient for the receiving device to consider the carrier signal as a data signal. Relatively, amplitude and/or phase modulation is performed on a waveform corresponding to the data signal, and an overall amplitude is sufficient for the receiving device to consider the data signal as a data signal.

(5) Terms "system" and "network" may be used interchangeably in embodiments of this application. In embodiments of this application, "a plurality of" may also be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise specified, ordinal numbers such as "first" and "second" in embodiments of this application are used to distinguish between a plurality of objects, and are not intended to limit a sequence, a time sequence, priorities, or importance of the plurality of objects. For example, a first device and a second device are merely used to distinguish between different devices, but are not used to limit functions, priorities, or importance of the two devices. In embodiments of this application, "if" and "if" may be exchanged, and unless otherwise specified, "when" and "in a case of" may be exchanged.

Embodiments of this application are intended to reduce interference between signals without increasing complexity of a filter in a receiver. To better understand the solutions provided in embodiments of this application, some related concepts of the receiver are first described.

Figure 2:
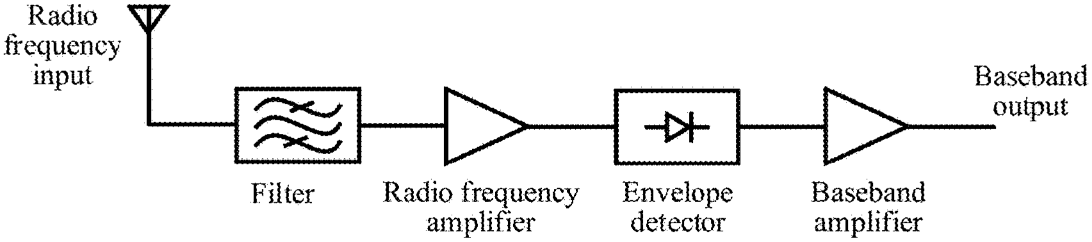
FIG. 2 is a diagram of a structure of a receiver using an envelope detector.

The receiver may process a received signal through amplitude modulation and envelope detection, to avoid using a radio frequency module with high power, for example, a frequency mixer with high linearity, so as to implement low power consumption. A module that is in the receiver and that is configured to complete envelope detection may be referred to as an envelope detector. FIG. 2 is a diagram of a structure of a receiver using an envelope detector. As shown in FIG. 2, the receiver mainly includes a radio frequency amplifier, the envelope detector, and a baseband amplifier. The envelope detector is a non-linear component and has large noise. Therefore, to correctly demodulate a received signal, before the envelope detector, the received signal needs to be amplified by using the radio frequency amplifier. After the envelope detector outputs a baseband signal, the baseband amplifier may amplify and output the baseband signal. The receiver requires high passband selectivity. Therefore, before the radio frequency amplifier, a received radio frequency signal needs to be filtered by using a filter. It may be understood that the filter is a filter circuit including a capacitor, an inductor, and a resistor, and is mainly configured to filter a signal frequency. The filter allows a signal of a specific frequency to pass through, while suppressing a signal of another undesired frequency. This can resolve a problem of interference between signals in different frequency bands. It should be noted that FIG. 2 is merely an example of composition of the receiver. Specific composition of the receiver is not limited in this embodiment of this application. For example, the receiver may alternatively include a plurality of envelope detectors.

Figure 3:
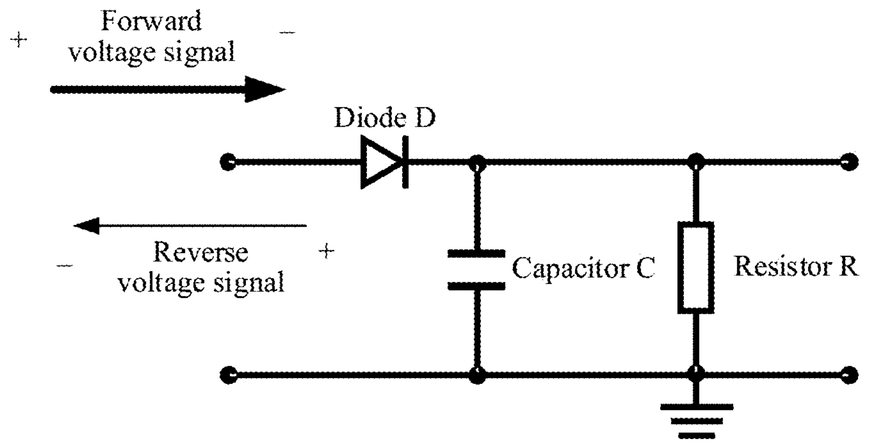
FIG. 3 is a schematic of a circuit structure of an envelope detector.

FIG. 3 is a schematic of a circuit structure of an envelope detector. The envelope detector mainly includes a diode and an oscillation circuit that includes a capacitor and a resistor. The envelope detector is a non-linear component, which works by using a unidirectional conductivity of the diode. As shown in FIG. 3, a forward voltage signal (as shown in a direction of a thick arrow in the figure) is input to the diode. When a potential difference between two sides of the diode is higher than a conduction voltage, the diode is turned on, a current flows to the ground through the resistor R, a potential difference between two ends of the capacitor C exists, and the capacitor works in a charging state. When a reverse voltage signal (as shown in a direction of a thin arrow in the figure) is input to the diode, the diode is in a disconnected state, in other words, the diode is not conducted. In this case, the capacitor is in a discharging state, and a current flows to the ground through the resistor R.

Figure 4:
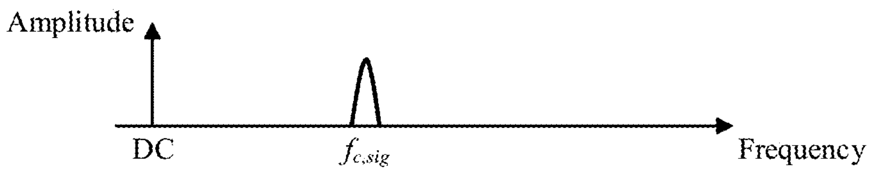
FIG. 4 is a diagram of a spectrum of an input signal of an envelope detector when there is no interference.

When there is no interference signal, it is assumed that an input signal $x_{sig}(t)$ of the envelope detector satisfies:

$x_{sig}(t)=A_{sig}(t)\times\cos(2\pi f_{c,sig}t)$, where $A_{sig}(t)$ represents a wanted signal, and $f_{c,sig}$ is a carrier frequency used to carry the wanted signal. FIG. 4 is a diagram of a spectrum of $x_{sig}(t)$.

An output signal $y_{sig}(t)$ of the envelope detector satisfies: $y_{sig}(t)=(x_{sig}(t))^2=(A_{sig}(t))^2\times(1+\cos(2\pi\times 2f_{c,sig}t))/2$.

Figure 5:
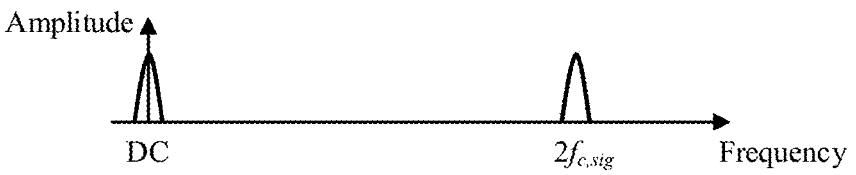
FIG. 5 is a diagram of a spectrum of an output signal of an envelope detector when there is no interference.
Figure 6:
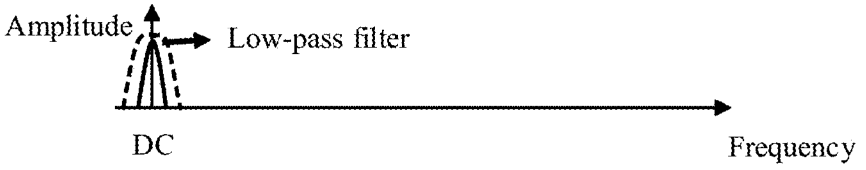
FIG. 6 is a diagram of a spectrum of a baseband signal after an envelope detector when there is no interference.

FIG. 5 is a diagram of a spectrum of $y_{sig}(t)$. It can be learned that a component whose frequency is $2f_{c,sig}$ is a high-frequency component. A baseband signal $\tilde{y}_{sig}(t)=(A_{sig}(t))^2/2$ can be obtained by filtering out the high-frequency component by using a low-pass filter. A spectrum of $\tilde{y}_{sig}(t)$ is shown in FIG. 6. It can be seen from FIG. 4 to FIG. 6 that, when there is no interference signal, the spectrum of $\tilde{y}_{sig}(t)$ is concentrated near a direct current (DC).

Figure 7:
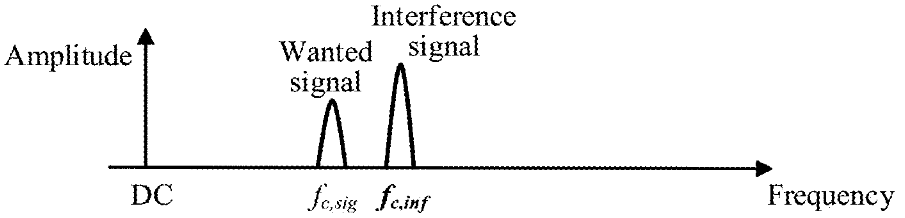
FIG. 7 is a diagram of a spectrum of an input signal of an envelope detector when there is interference.

When there is an interference signal, for example, the interference signal is input into the envelope detector, and $x_{inf}(t)$ satisfies: $x_{inf}(t)=A_{inf}(t)\times\cos(2\pi f_{c,inf}t)$, where $A_{inf}(t)$ represents the interference signal, and $f_{c,inf}$ is a carrier frequency used to carry the interference signal. In this case, an input signal x(t) of the envelope detector satisfies: $x(t)=x_{sig}(t)+x_{inf}(t)$. A spectrum of the input signal is shown in FIG. 7.

An output signal y(t) of the envelope detector satisfies:

$$y(t)=(x(t))^2=(x_{sig}(t)+x_{inf}(t))^2$$

Figure 8:
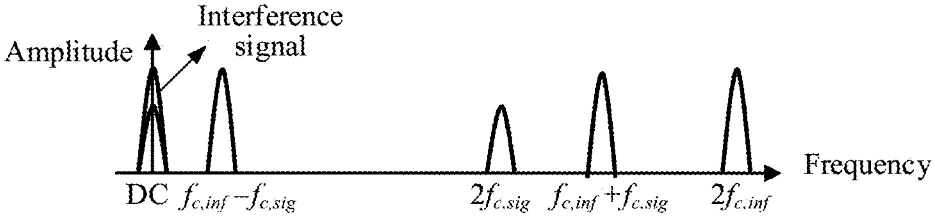
FIG. 8 is a diagram of a spectrum of an output signal of an envelope detector when there is interference.

$x_{sig}(t)$ and $x_{inf}(t)$ are substituted into the foregoing formula, and y(t) satisfies:

$$y(t)=(A_{sig}(t))^2\times(1+\cos(2\pi\cdot 2f_{c,sig}t))/2+(A_{inf}(t))^2\times(1+\cos(2\pi\times 2f_{c,inf}t))/2+A_{sig}(t)A_{inf}(t)\times\cos(2\pi(f_{c,inf}+f_{c,sig})t)+A_{sig}(t)A_{inf}(t)\times\cos(2\pi(f_{c,inf}-f_{c,sig})t),$$

where a frequency in y(t) is $2f_{c,sig}$, and components of $2f_{c,inf}$ and $f_{c,inf}+f_{c,sig}$ are high-frequency components. FIG. 8 is a diagram of a spectrum of y(t). After a low-pass filter performs filtering, a baseband signal $\tilde{y}(t)$ can be obtained to satisfy:

$$\tilde{y}(t)=(A_{sig}(t))^2/2+(A_{inf}(t))^2/2+A_{sig}(t)A_{inf}(t)\times\cos(2\pi(f_{c,inf}-f_{c,sig})t)$$

Figure 9:
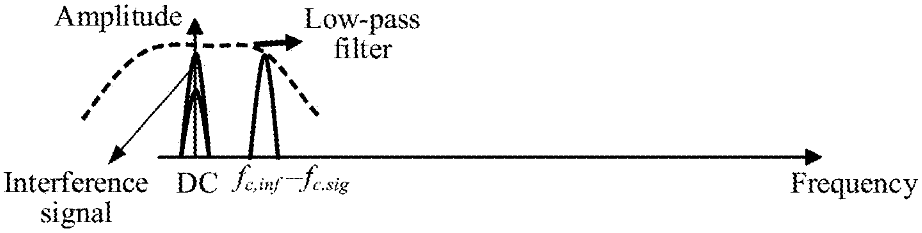
FIG. 9 is a diagram of a spectrum of a baseband signal after an envelope detector when there is interference.

A spectrum of $\tilde{y}(t)$ is shown in FIG. 9. It can be seen that $(A_{sig}(t))^2/2$ and $(A_{inf}(t))^2/2$ in $\tilde{y}(t)$ are near a DC, but the low-pass filter cannot filter out an interference signal near the DC.

In addition, performance of a filter directly affects communication quality. Indicators for measuring the performance of the filter include a Q value, a bandwidth, stopband suppression, an insertion loss, delay time, and the like. The Q value and the insertion loss are the most important performance indicators. The Q value is a figure of merit of the filter, and indicates a capability of the filter to separate adjacent frequency components in a signal. A higher Q value indicates a narrower passband width, better frequency band selectivity, and a better filtering effect. The insertion loss is a loss caused by introduction of the filter to an original signal in a circuit, and is represented by dB. A greater insertion loss value indicates greater attenuation. For example, if the insertion loss is 3 dB, signal power is attenuated by 50%. Therefore, a receiver requires a filter with a high Q value to achieve a good filtering effect. However, a Q value of an on-chip filter is usually low. If the Q value of the on-chip filter is expected to be high, a bulk acoustic wave (BAW) or a surface acoustic wave (SAW) needs to be externally connected. It is clear that an integration level of the receiver is low, and a requirement for a small receiver size cannot be satisfied.

In view of this, the solutions in embodiments of this application are provided. In embodiments of this application, a transmit end device may send two signals (for example, a first signal and a second signal) at two frequency positions (for example, a first frequency and a second frequency). For example, the transmit end device sends the first signal at a first frequency position, and sends the second signal at a second frequency position. For a receive end device, a radio frequency filter of the receive end device needs to enable the first signal and the second signal to pass through, in other words, a passband of the radio frequency filter needs to include the first frequency and the second frequency. It may be understood that a larger interval between the first frequency and the second frequency indicates a lower requirement on a Q value of the radio frequency filter, in other words, a radio frequency filter with a higher Q value is not required. Therefore, according to the method in embodiments of this application, design and implementation complexity of the radio frequency filter may not be increased. In addition, a second device may receive the first signal and the second signal through envelope detection. After envelope detection is performed, an intermediate-frequency component corresponding to an absolute value of a difference between the first frequency and the second frequency is a signal (referred to as a target signal in this specification) that the receive end device needs to obtain. Therefore, the receive end device may obtain the target signal by using an intermediate frequency filter, to suppress another signal that includes interference. Because a frequency of an intermediate frequency is lower than a frequency of a radio frequency, the intermediate frequency filter is easier to be designed and implemented under a same Q value requirement. Therefore, according to the solution in this embodiment of this application, after envelope detection is performed, the second device may easily distinguish between the target signal and the interference by using the intermediate frequency filter, and the design and implementation complexity of the radio frequency filter is not increased.

For ease of understanding, an example in which a first device sends the first signal to the second device at the first frequency and sends the second signal at the second frequency is used, to describe how to implement interference suppression in the solutions provided in embodiments of this application.

Figure 10:
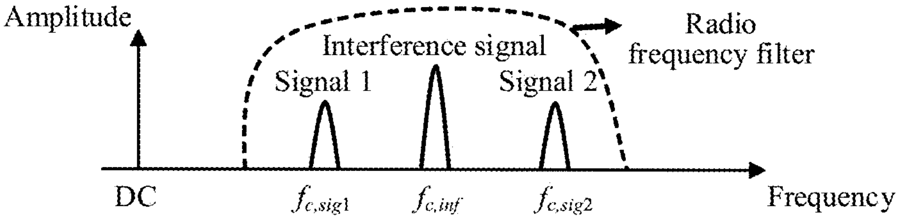
FIG. 10 is a diagram of a spectrum of an input signal of an envelope detector when there is interference according to an embodiment of this application.

When there is an interference signal, an input x(t) of an envelope detector satisfies: $x(t)=x_{sig1}(t)+x_{sig2}(t)+x_{inf}(t)$. $x_{inf}(t)=A_{inf}(t)\times\cos(2\pi f_{c,inf}t)$, where $A_{inf}(t)$ represents the interference signal, and $f_{c,inf}$ is a carrier frequency used to carry the interference signal. $x_{sig1}(t)=A_{sig1}(t)\times\cos(2\pi f_{c,sig1}t)$, where $A_{sig1}(t)$ represents the first signal, and $f_{c,sig1}$ is a carrier frequency used to carry the first signal. $x_{sig2}(t)=A_{sig2}(t)\times\cos(2\pi f_{c,sig2}t)$, where $A_{sig2}(t)$ represents the second signal, and $f_{c,sig2}$ is a carrier frequency used to carry the second signal. FIG. 10 is a diagram of a spectrum of x(t). In FIG. 10, a signal 1 is the first signal, and a signal 2 is the second signal.

An output signal y(t) of the envelope detector satisfies:

$$y(t)=(x(t))^2=(x_{sig1}(t)+x_{sig2}(t)+x_{inf}(t))^2$$

$x_{sig1}(t)$, $x_{sig2}(t)$, and $x_{inf}(t)$ are substituted into the foregoing formula, to obtain:

$$\begin{aligned}y(t)=&(A_{sig1}(t))^2\times(1+\cos(2\pi\times2f_{c,sig1}t))/2+\\&(A_{sig2}(t))^2\times(1+\cos(2\pi\times2f_{c,sig2}t))/2+\\&(A_{inf}(t))^2\times(1+\cos(2\pi\times2f_{c,inf}t))/2+\\&A_{sig1}(t)A_{inf}(t)\times\cos(2\pi(f_{c,inf}+f_{c,sig1})t)+\\&A_{sig1}(t)A_{inf}(t)\times\cos(2\pi(f_{c,inf}-f_{c,sig1})t)+\\&A_{sig2}(t)A_{inf}(t)\times\cos(2\pi(f_{c,sig2}+f_{c,inf})t)+\\&A_{sig2}(t)A_{inf}(t)\times\cos(2\pi(f_{c,sig2}-f_{c,inf})t)+\\&A_{sig1}(t)A_{sig2}(t)\times\cos(2\pi(f_{c,sig2}+f_{c,sig1})t)+\\&A_{sig1}(t)A_{sig2}(t)\times\cos(2\pi(f_{c,sig2}-f_{c,sig1})t)\end{aligned}$$

Figure 11:
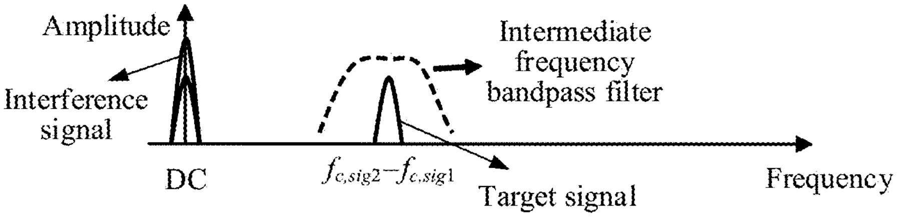
FIG. 11 is a diagram of a spectrum of an output signal of an envelope detector when there is interference according to an embodiment of this application.

It can be learned from the foregoing formula that the output signal of the envelope detector includes a high-frequency component, an intermediate-frequency component, and a DC component. Frequencies of the high-frequency component include $2f_{c,sig1}$, $2f_{c,sig2}$, $2f_{c,inf}$, $f_{c,inf}+f_{c,sig1}$, and $f_{c,sig2}+f_{c,inf}$ and $f_{c,sig2}+f_{c,sig1}$. Frequencies of the intermediate-frequency component include $f_{c,inf}-f_{c,sig1}$, $f_{c,sig2}-f_{c,inf}$, and $f_{c,sig2}-f_{c,sig1}$. In the intermediate-frequency component, only a component whose frequency is $f_{c,sig2}-f_{c,sig1}$ does not include interference. Therefore, a bandpass filter may be used to ensure that only the component whose frequency is $f_{c,sig2}-f_{c,sig1}$ passes through, and suppress other frequency components. As shown in FIG. 11, the interference signal may be filtered out by using an intermediate frequency bandpass filter, to obtain a target signal $\tilde{y}(t)$:$\tilde{y}(t)=A_{sig1}(t)A_{sig2}(t)\times\cos(2\pi(f_{c,sig2}-f_{c,sig1})t)$.

Figure 12:
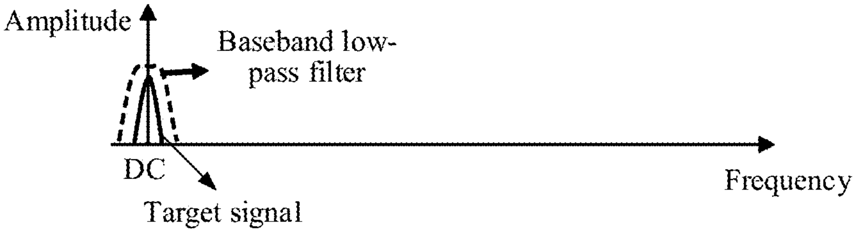
FIG. 12 is a diagram of a spectrum of a baseband signal after an envelope detector when there is interference according to an embodiment of this application.

It may be understood that $A_{sig1}(t)A_{sig2}(t)\times\cos(2\pi(f_{c,sig2}-f_{c,sig1})t)$ is the intermediate-frequency component, and complexity and power consumption of intermediate frequency processing are high. To reduce the processing complexity and power consumption, the second device may filter the intermediate-frequency component by using the bandpass filter, and then further perform down-conversion processing on the intermediate-frequency component that passes through the bandpass filter, to obtain a baseband signal, as shown in FIG. 12. An implementation of down-conversion is not limited in embodiments of this application. For example, the second device may implement a down-conversion operation by using the envelope detector, or may implement the down-conversion operation by using a low-frequency crystal oscillator and a frequency mixer.

An example in which the second device may implement the down-conversion operation by using the envelope detector is used. For example, an input signal of the envelope detector is $\tilde{y}(t)$, and an output signal z(t) of the envelope detector satisfies:

$$z(t)=(\tilde{y}(t))^2=(A_{sig1}(t)A_{sig2}(t))^2\times(1+\cos(2\pi\times2(f_{c,sig2}-f_{c,sig1})t))/2$$

The output signal of the envelope detector includes a high-frequency component whose frequency is $2(f_{c,sig2}-f_{c,sig1})$. Therefore, the high-frequency component may be filtered out by using a low-pass filter, and a baseband signal $\tilde{z}(t)$ can be obtained, where $\tilde{z}(t)$ satisfies:

$$\tilde{z}(t)=(A_{sig1}(t)A_{sig2}(t))^2/2$$

Therefore, the second device may restore, based on $\tilde{z}(t)$, information carried in the first signal and/or the second signal.

An example in which the second device implements the down-conversion operation by using the frequency mixer is used. One input signal of the frequency mixer is $\tilde{y}(t)$, and another input signal is from the low-frequency crystal oscillator. It is assumed that a signal generated by the low-frequency crystal oscillator is c(t), and c(t) satisfies:

$$c(t)=\cos(2\pi(f_{c,sig2}-f_{c,sig1})t)$$

In this case, an output signal z(t) of the frequency mixer satisfies:

$$z(t)=\tilde{y}(t)\times c(t)=A_{sig1}(t)A_{sig2}(t)\times(1+\cos(2\pi\cdot2(f_{c,sig2}-f_{c,sig1})t))/2$$

The output signal of the envelope detector includes a high-frequency component whose frequency is $2(f_{c,sig2}-f_{c,sig1})$. Therefore, the high-frequency component may be filtered out by using a low-pass filter, and a baseband signal $\tilde{z}(t)$ can be obtained, where $\tilde{z}(t)$ satisfies:

$$\tilde{z}(t)=(A_{sig1}(t)A_{sig2}(t))/2$$

Therefore, the second device may restore, based on $\tilde{z}(t)$, information carried in the first signal and/or the second signal.

In an example, both $A_{sig1}(t)$ and $A_{sig2}(t)$ may be data signals, to be specific, signals that carry useful information. It is assumed that modulation schemes of $A_{sig1}(t)$ and $A_{sig2}(t)$ are ASK or OOK, and at a moment t, all information bits carried by $A_{sig1}(t)$ and $A_{sig2}(t)$ are "i". In this case, the second device may obtain the information bit "1" by detecting $\tilde{z}(t)$. For example, the second device obtains the information bit "i" from $(A_{sig1}(t)A_{sig2}(t))^2/2$ or $(A_{sig1}(t)A_{sig2}(t))/$ 2, in other words, obtains useful information. Alternatively, at a moment t, it is assumed that all information bits carried by $A_{sig1}(t)$ and $A_{sig2}(t)$ are "0". In this case, the second device may obtain the information bit "0" by detecting $\tilde{z}(t)$. For example, the second device obtains the information bit "0" from $(A_{sig1}(t)A_{sig2}(t))^2/2$ or $(A_{sig1}(t)A_{sig2}(t))/2$, in other words, obtains useful information.

In another example, if one signal of $A_{sig1}(t)$ and $A_{sig2}(t)$ is a data signal, and the other signal is a carrier signal, for example, if $A_{sig1}(t)$ is a data signal, it is assumed that a modulation scheme of $A_{sig1}(t)$ is ASK or OOK, and if $A_{sig2}(t)$ is a carrier signal, and does not carry useful information, $A_{sig2}(t)$ may be a constant value, for example, $A_{sig2}(t)$ is always 1. In this case, $\tilde{z}(t)=A_{sig1}(t)/2$, and the second device only needs to pay attention to $A_{sig1}(t)$ to obtain useful information. At a moment t, all information bits carried by $A_{sig1}(t)$ are "1", and the second device may obtain the information bit "1" by detecting z(t). For example, the second device obtains the information bit "1" from $(A_{sig1}(t)A_{sig2}(t))^2/2$ or $(A_{sig1}(t)A_{sig2}(t))/2$, in other words, obtains useful information. Alternatively, at a moment t, all information bits carried by $A_{sig1}(t)$ are "0", and the second device may obtain the information bit "0" by detecting $\tilde{z}(t)$. For example, the second device obtains the information bit "0" from $(A_{sig1}(t)A_{sig2}(t))^2/2$ or $(A_{sig1}(t)A_{sig2}(t))/2$, in other words, obtains useful information.

Figure 14:
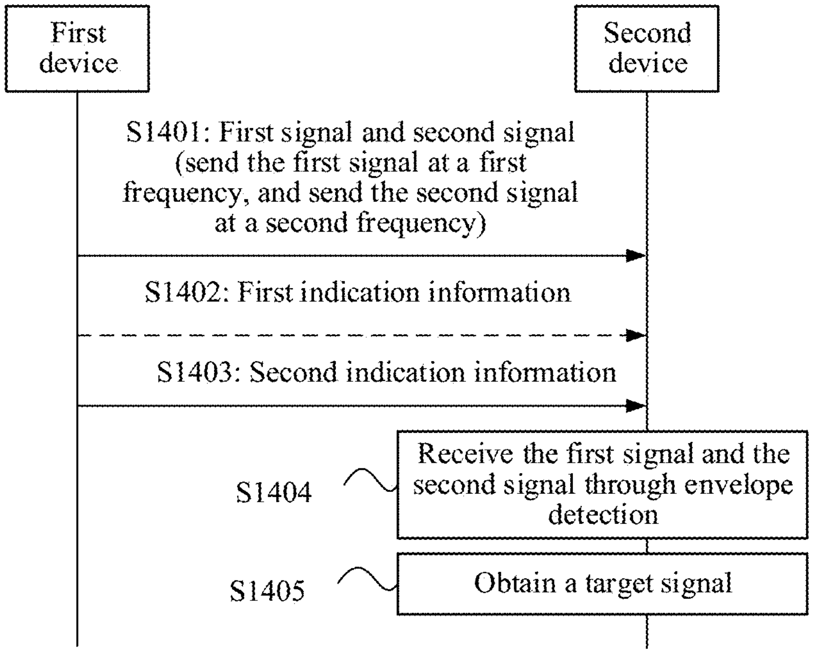
FIG. 14 is a schematic flowchart of signal sending and signal receiving according to an embodiment of this application.

The following describes, with reference to the accompanying drawings, the solutions provided in embodiments of this application. FIG. 14 is a schematic flowchart of a signal sending method and a signal receiving method according to an embodiment of this application. The following uses an example in which a transmit end is a first device and a receive end is a second device. The first device may be a terminal device, and the second device may be an access network device.

S1401: The first device sends a first signal to the second device on a first frequency domain unit, and sends a second signal on a second frequency domain unit.

It may be understood that, for a radio frequency filter, filtering a signal within a narrow frequency range imposes a high requirement on the radio frequency filter. In this embodiment of this application, when sending signals to the second device, the first device may send two signals at two frequency positions, to reduce the requirement on the radio frequency filter. For example, the first device determines (generates) the first signal and the second signal, and may send the first signal at a first frequency of the first frequency domain unit, and send the second signal at a second frequency of the second frequency domain unit. The first frequency domain unit may be considered as a frequency domain resource used to send the first signal, and the second frequency domain unit may be considered as a frequency domain resource used to send the second signal. It should be noted that the first frequency may be a center frequency of the first frequency domain unit, and correspondingly, the second frequency is a center frequency of the second frequency domain unit. Alternatively, the first frequency may be a lowest frequency of the first frequency domain unit, and correspondingly, the second frequency is a lowest frequency of the second frequency domain unit. Alternatively, the first frequency may be a highest frequency of the first frequency domain unit, and correspondingly, the second frequency is a highest frequency of the second frequency domain unit. It should be noted that the first frequency unit may include two sub-frequency units: a first sub-frequency unit and a second sub-frequency unit. A frequency of the first sub-frequency unit is higher than a frequency of the second sub-frequency unit. The second frequency unit may include two sub-frequency units: a third sub-frequency unit and a fourth sub-frequency unit. A frequency of the third sub-frequency unit is higher than a frequency of the fourth sub-frequency unit. In this case, the first frequency may be a center frequency of the first sub-frequency domain unit, and correspondingly, the second frequency is a center frequency of the third sub-frequency domain unit. Alternatively, the first frequency may be a lowest frequency of the first sub-frequency domain unit, and correspondingly, the second frequency is a lowest frequency of the third sub-frequency domain unit. Alternatively, the first frequency may be a highest frequency of the first sub-frequency domain unit, and correspondingly, the second frequency is a highest frequency of the third sub-frequency domain unit. Alternatively, the first frequency may be a center frequency of the second sub-frequency domain unit, and correspondingly, the second frequency is a center frequency of the fourth sub-frequency domain unit. Alternatively, the first frequency may be a lowest frequency of the second sub-frequency domain unit, and correspondingly, the second frequency is a lowest frequency of the fourth sub-frequency domain unit. Alternatively, the first frequency may be a highest frequency of the second sub-frequency domain unit, and correspondingly, the second frequency is a highest frequency of the fourth sub-frequency domain unit.

The first device sends the first signal and the second signal. Correspondingly, a passband of a radio frequency filter of the second device may include the first frequency and the second frequency. It may be understood that a larger difference between the first frequency and the second frequency indicates a lower requirement on design and implementation complexity of the radio frequency filter. Therefore, when the first device sends the first signal at the first frequency, and sends the second signal at the second frequency, the design and implementation complexity of the radio frequency filter of the second device is not increased. It should be noted that the difference between the first frequency and the second frequency is an absolute value of the difference between the first frequency and the second frequency. For example, if the first frequency is greater than the second frequency, the difference between the first frequency and the second frequency is obtained by subtracting the second frequency from the first frequency. If the first frequency is less than the second frequency, the difference between the first frequency and the second frequency is obtained by subtracting the first frequency from the second frequency.

In addition, considering existence of an interference signal, the second device may receive the first signal and the second signal through envelope detection. After envelope detection is performed, an intermediate-frequency component corresponding to the absolute value of the difference between the first frequency and the second frequency is a target signal that the second device needs to obtain. In this case, the second device may obtain the target signal by using an intermediate frequency bandpass filter, to suppress another frequency component that includes interference. It may be understood that, a frequency of an intermediate frequency is lower than a frequency of a radio frequency, and an intermediate frequency filter is easier to be designed and implemented under a same Q value requirement. Therefore, after envelope detection is performed, the second device may easily distinguish between the target signal and the interference by using the intermediate frequency filter.

In this embodiment of this application, the absolute value of the difference between the first frequency and the second frequency needs to satisfy a specific condition, to reduce the requirement on the radio frequency filter as much as possible, and improve an interference suppression effect as much as possible.

In a possible implementation, the first device may determine the absolute value based on one or more of a bandwidth occupied by the first frequency domain unit in frequency domain, a bandwidth occupied by the second frequency domain unit in frequency domain, or a bandwidth occupied, in frequency domain, by a frequency domain unit that is used by the first device to send a signal to a device other than the second device. For ease of description, in this specification, the bandwidth occupied by the first frequency domain unit in frequency domain is referred to as a first bandwidth, the bandwidth occupied by the second frequency domain unit in frequency domain is referred to as a second bandwidth, and the bandwidth occupied, in frequency domain, by the frequency domain unit (for example, referred to as a third frequency domain unit) that is used by a device (for example, a third device) other than the second device to send a signal is referred to as a third bandwidth. It may also be understood as that the absolute value of the difference between the first frequency and the second frequency is related to one or more of the first bandwidth, the second bandwidth, or the third bandwidth. It may be understood that the first signal, the second signal, and a third signal are in one operating band. The operating band is a frequency band used for communication between the first device and the second device, and may be an NR operating band. It should be noted that, there may be one third device, or may be a plurality of third devices.

In an example, the first device sends the first signal and the second signal within a frequency range corresponding to a channel bandwidth of the second device. In this case, the absolute value of the difference between the first frequency and the second frequency is greater than or equal to ½ of the channel bandwidth of the second device. It may be understood that the absolute value of the difference between the first frequency and the second frequency is less than or equal to the channel bandwidth of the second device. The channel bandwidth of the second device may be sent by the second device to the first device. Because the absolute value of the difference between the first frequency and the second frequency is greater than or equal to ½ of the channel bandwidth of the second device, a frequency of the intermediate-frequency component (namely, the target signal) obtained by the second device by receiving the first signal and the second signal through envelope detection is different from a frequency of the interference signal. In other words, the target signal and the interference signal do not overlap in a spectrum, so that the interference signal can be easily filtered out by using the intermediate frequency filter, and the requirement on the radio frequency filter is low. For ease of understanding, the following uses a figure as an example.

Figure 15:
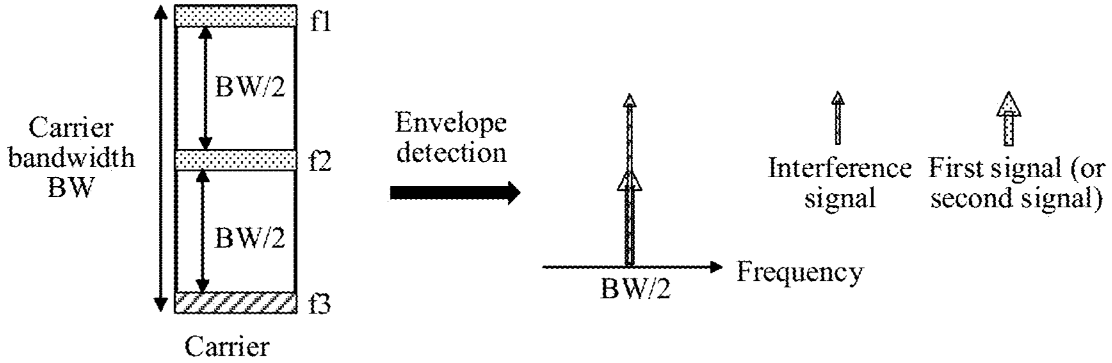
FIG. 15 is a diagram of frequency positions of a target signal and an interference signal according to an embodiment of this application (where an absolute value of a difference between a first frequency and a second frequency is equal to ½ of a carrier bandwidth)

FIG. 15 is a diagram of frequency positions of the target signal and the interference signal when the absolute value of the difference between the first frequency and the second frequency is equal to ½ of a carrier bandwidth. It should be noted that the carrier bandwidth (BW) is less than or equal to the channel bandwidth of the second device. In FIG. 15, f1 is the first frequency, f2 is the second frequency, and f3 is a frequency (referred to as a third frequency) of the interference signal. In addition, in FIG. 15, f1 is a highest frequency of the BW, f2 is ½ of the BW, and f3 is a lowest frequency of the BW. As shown in FIG. 15, when the first device sends the first signal at f1, sends the second signal at f2, and sends the interference signal at f3, the second device receives the first signal and the second signal through envelope detection, and the second device may obtain a signal, namely, a target signal, at f1-f2. Because the absolute value of the difference between the first frequency and the second frequency is equal to ½ of the BW, the frequency of the target signal is ½ of the BW, and the frequency of the interference signal is ½ of the BW. In other words, the interference signal and the target signal overlap in the spectrum, so that it is difficult to filter out the interference signal by using the filter, and the requirement on the radio frequency filter is high.

Figure 16:
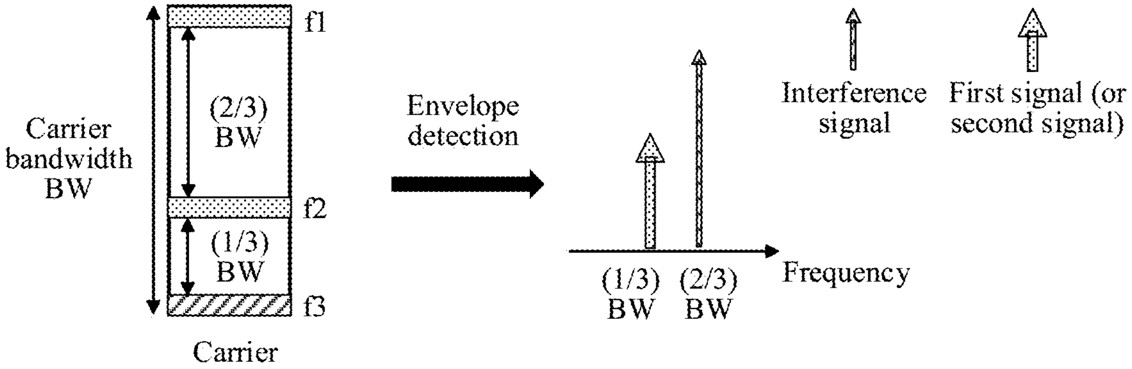
FIG. 16 is a diagram of frequency positions of a target signal and an interference signal according to an embodiment of this application (where an absolute value of a difference between a first frequency and a second frequency is greater than ½ of a carrier bandwidth)

Relatively, FIG. 16 is a diagram of frequency positions of the target signal and the interference signal when the absolute value of the difference between the first frequency and the second frequency is greater than ½ of a carrier bandwidth. Different from FIG. 15, in FIG. 16, f2 is ⅓ of the BW. The second device receives the first signal and the second signal through envelope detection, and the second device may obtain a signal, namely, a target signal, at f1-f2. Because the absolute value of the difference between the first frequency and the second frequency is ⅔ of the BW, and is greater than ½ of the BW, the frequency of the target signal is at f1-f2, that is, ⅓ of the BW, and the frequency of the interference signal is ⅔ of the BW. In other words, the interference signal and the target signal do not overlap in the spectrum, so that the interference signal can be easily filtered out by using the intermediate frequency filter, and the requirement on the radio frequency filter is low.

It should be noted that, in FIG. 15 and FIG. 16, an example in which the first frequency and the second frequency are on one side of a third frequency is used. A relative position relationship between the first frequency and the second frequency and the third frequency is not limited in this embodiment of this application. For example, the first frequency and the second frequency may be on two sides of the third frequency. In addition, the first device may be configured with a carrier bandwidth. For example, the first device is configured with the carrier bandwidth based on the channel bandwidth of the second device. Therefore, before sending the first signal and the second signal, the first device may determine the first frequency and the second frequency.

In another example, the absolute value of the difference between the first frequency and the second frequency is greater than or equal to a sum of the third bandwidth and a fourth bandwidth, the fourth bandwidth is twice a sum of the first bandwidth and the second bandwidth, and the third signal falls between the first frequency and the second frequency in frequency domain. In other words, the absolute value of the difference between the first frequency and the second frequency is greater than or equal to the third bandwidth+2×(the first bandwidth+the second bandwidth). It may be understood that, when the absolute value of the difference between the first frequency and the second frequency is greater than or equal to the third bandwidth+2×(the first bandwidth+the second bandwidth), a difference between a frequency of the target signal and a frequency of the interference signal is large, and the interference signal and the target signal are easy to be distinguished. Therefore, it is easy to filter out the interference signal by using the intermediate frequency filter, and the requirement on the radio frequency filter is lower. For ease of understanding, the following uses a figure as an example.

Figure 17:
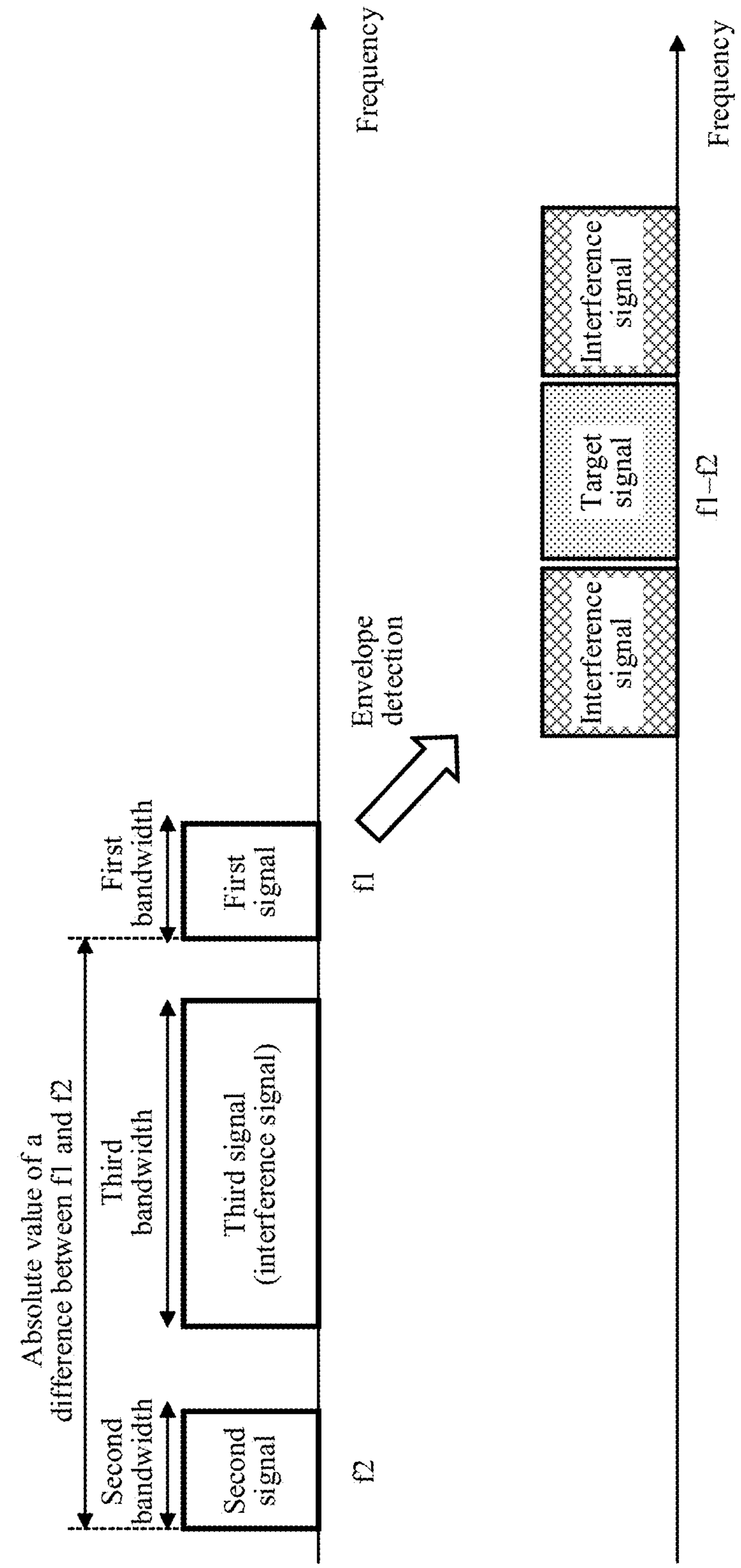
FIG. 17 is a diagram of relative frequency positions of a first signal, a second signal, and a third signal according to an embodiment of this application.

FIG. 17 is a diagram of relative frequency positions of the first signal, the second signal, and the third signal. In FIG. 17, an example in which the first frequency (f1) is a lowest frequency of the first frequency domain unit, and the second frequency (f2) is a lowest frequency of the second frequency domain unit is used. It can be learned from FIG. 17 that, when the absolute value of the difference between the first frequency and the second frequency is greater than or equal to the third bandwidth+2×(the first bandwidth+the second bandwidth), the target signal and the interference signal do not overlap in the spectrum, so that the target signal and the interference signal can be distinguished. It may be understood that a larger absolute value of the difference between the first frequency and the second frequency indicates a longer distance between the target signal and the interference signal in the spectrum, in other words, in FIG. 17, indicates a longer distance between a frequency boundary of the interference signal and a frequency boundary of the target signal. In this way, it is easier for the second device to extract the target signal by using the intermediate frequency filter.

Before sending the first signal and the second signal, the first device may determine the first frequency and the second frequency. For example, the first device determines the first frequency, and may determine the second frequency based on the absolute value of the difference between the first frequency and the second frequency. Alternatively, the first device determines the second frequency, and then determines the first frequency based on the absolute value of the difference between the first frequency and the second frequency. The second device needs to know the absolute value of the difference between the first frequency and the second frequency, so that the second device can know a frequency position at which the target signal is obtained.

In a possible implementation, the absolute value of the difference between the first frequency and the second frequency may be predefined or preconfigured. For example, the absolute value of the difference between the first frequency and the second frequency is a preset value. For example, the preset value may be determined based on one or more of the operating band of the first signal and the second signal, a subcarrier spacing of the first signal, or a subcarrier spacing of the second signal. It may also be understood as that the preset value is related to one or more of the following: the operating band of the first signal and the second signal, the subcarrier spacing of the first signal, or the subcarrier spacing of the second signal. Alternatively, the preset value has a correspondence with one or more of the following: the operating band of the first signal and the second signal, a subcarrier spacing of the first signal, or a subcarrier spacing of the second signal. Because the absolute value of the difference between the first frequency and the second frequency is the preset value, after the first device establishes a communication connection to the second device, the first device sends first signaling between the first device and the second device to the second device by using the first frequency and the second frequency. In other words, the absolute value of the difference between the first frequency and the second frequency is preset, and this is applicable to a scenario in which the first device does not need to notify the second device of the absolute value of the difference between the first frequency and the second frequency. Certainly, the absolute value of the difference between the first frequency and the second frequency is the preset value, and this may alternatively be used by the first device to send signaling other than the first signaling between the first device and the second device to the second device.

When the absolute value of the difference between the first frequency and the second frequency is the preset value, the first device may send the first signal at the first frequency and send the second signal at the second frequency based on the preset value. Correspondingly, the second device may also obtain, based on the preset value, a signal at a frequency position corresponding to the absolute value of the difference between the first frequency and the second frequency.

In another possible implementation, the absolute value of the difference between the first frequency and the second frequency may be notified by the first device to the second device.

S1402: The first device sends first indication information to the second device, and correspondingly, the second device receives the first indication information sent by the first device, where the first indication information indicates the absolute value of the difference between the first frequency and the second frequency.

The first device may dynamically indicate the absolute value of the difference between the first frequency and the second frequency by using the first indication information, and this is more flexible. For example, when determining the absolute value of the difference between the first frequency and the second frequency, the first device may refer to a maximum transmission bandwidth capability of the second device. Therefore, for different receiving devices, the first device may adaptively adjust the absolute value of the difference between the first frequency and the second frequency, to reduce a requirement on a radio frequency filter of each receiving device as much as possible. The second device obtains, based on the absolute value indicated by the first indication information, the signal at the frequency position corresponding to the absolute value of the difference between the first frequency and the second frequency.

A specific implementation form in which the first indication information indicates the absolute value of the difference between the first frequency and the second frequency is not limited in this embodiment of this application. For example, the first indication information may directly indicate the absolute value of the difference between the first frequency and the second frequency, and this is simple and direct. For example, the first indication information may include the absolute value of the difference between the first frequency and the second frequency.

For example, the first indication information may indirectly indicate the absolute value of the difference between the first frequency and the second frequency. For example, the first indication information may include the difference between the first frequency and the second frequency. The second device may determine the absolute value of the difference between the first frequency and the second frequency based on the difference between the first frequency and the second frequency. For another example, the first indication information may include the first frequency and the second frequency. The second device may determine the absolute value of the difference between the first frequency and the second frequency based on the difference between the first frequency and the second frequency. For still another example, the first indication information may include some parameters used to determine the absolute value of the difference between the first frequency and the second frequency, and the second device may determine the absolute value of the difference between the first frequency and the second frequency based on these parameters. These parameters include, for example, one or more of the operating band of the first signal and the second signal, the subcarrier spacing of the first signal, or the subcarrier spacing of the second signal. For example, the first indication information includes the operating band of the first signal and the second signal, and indirectly indicates the absolute value of the difference between the first frequency and the second frequency. The second device may determine the absolute value of the difference between the first frequency and the second frequency based on a correspondence between the operating band and the absolute value of the difference between the first frequency and the second frequency, and the operating band of the first signal and the second signal. For another example, the first indication information includes the subcarrier spacing of the first signal, and the second device may determine the absolute value of the difference between the first frequency and the second frequency based on a correspondence between the subcarrier spacing and the absolute value of the difference between the first frequency and the second frequency, and the subcarrier spacing of the first signal.

It should be noted that, because the absolute value of the difference between the first frequency and the second frequency may be a preset value, S1402 is not a mandatory step, that is, is an optional step, and is shown by using a dashed line in FIG. 14. In addition, a sequence of performing S1401 and S1402 is not limited in this embodiment of this application. To be specific, S1402 may be performed before S1401, or may be performed after S1401, or may be performed simultaneously with S1401.

In a possible implementation, at most one of the first signal and the second signal is used to provide a carrier for uplink transmission of the second device. In other words, at most one of the first signal and the second signal is a carrier signal. For example, the first signal is a data signal, and the second signal is a carrier signal; or the first signal is a carrier signal, and the second signal is a data signal; or both the first signal and the second signal are data signals. It may be understood that, compared with the carrier signal, the data signal carries modulation information. When one of the first signal and the second signal is a data signal, and the other signal is a carrier signal, resource overheads of the first device can be reduced. When both the first signal and the second signal are data signals, data transmission reliability can be improved.

In a possible implementation, power of the first signal is the same as power of the second signal. Alternatively, power of the first signal may be different from power of the second signal.

For example, when the power of the first signal is the same as the power of the second signal, neither the first signal nor the second signal may be a carrier signal, in other words, both the first signal and the second signal are data signals. When the power of the first signal is greater than the power of the second signal, the first signal is a data signal, and the second signal may be a carrier signal, to reduce resource overheads. It may also be understood as that the first device determines that the power of the first signal is the same as the power of the second signal, and the first device may determine that both the first signal and the second signal are data signals. Alternatively, the first device determines that the power of the first signal is greater than the power of the second signal, and the first device may determine that the first signal is a data signal and the second signal is a carrier signal. It may be understood that the carrier signal does not carry useful information, and may be sent at a low power, to reduce energy consumption of a device. Therefore, in some examples, the first signal is a data signal, the second signal is a carrier signal, and transmit power of the first signal is greater than transmit power of the second signal. It may also be understood as that the first device determines that the first signal is a data signal, and the second signal is a carrier signal, and the first device determines that the transmit power of the first signal is greater than the transmit power of the second signal, to ensure data transmission reliability as much as possible. Certainly, if both the first signal and the second signal are data signals, the transmit power of the first signal may be the same as the transmit power of the second signal. It may also be understood as that the first device determines that both the first signal and the second device are data signals, and the first device determines that the transmit power of the first signal is the same as the transmit power of the second signal.

In a possible implementation, the carrier signal may be a single carrier signal. For example, if the first signal is a carrier signal, the first signal is a single carrier signal. For another example, if the second signal is a carrier signal, the second signal is a single carrier signal. Alternatively, the first signal or the second signal occupies one subcarrier in frequency domain. Alternatively, the first signal or the second signal is a signal including a subcarrier that carries energy.

In a possible implementation, the first signal and/or the second signal are/is multicarrier signals/a multicarrier signal. Alternatively, the first signal and/or the second signal occupy/occupies a plurality of subcarriers in frequency domain. The first signal and/or the second signal are/is signals/a signal including a plurality of subcarriers that carry energy.

Considering that a frequency domain resource used for communication between the first device and the second device may be an NR carrier or an LTE carrier, to reduce impact on an operating band of the NR carrier, a frequency position of the first signal and a frequency position of the second signal need to satisfy a specific condition. It may also be considered that the first frequency domain unit and the second frequency domain unit need to satisfy a specific condition, and the following two cases are included.

In a first case, at least one of the first signal and the second signal is in a guard band of one NR carrier or one LTE carrier; and/or the absolute value of the difference between the first frequency and the second frequency is greater than or equal to a transmission bandwidth of one NR carrier or one LTE carrier. For ease of understanding, the following uses a figure as an example.

Figure 18:
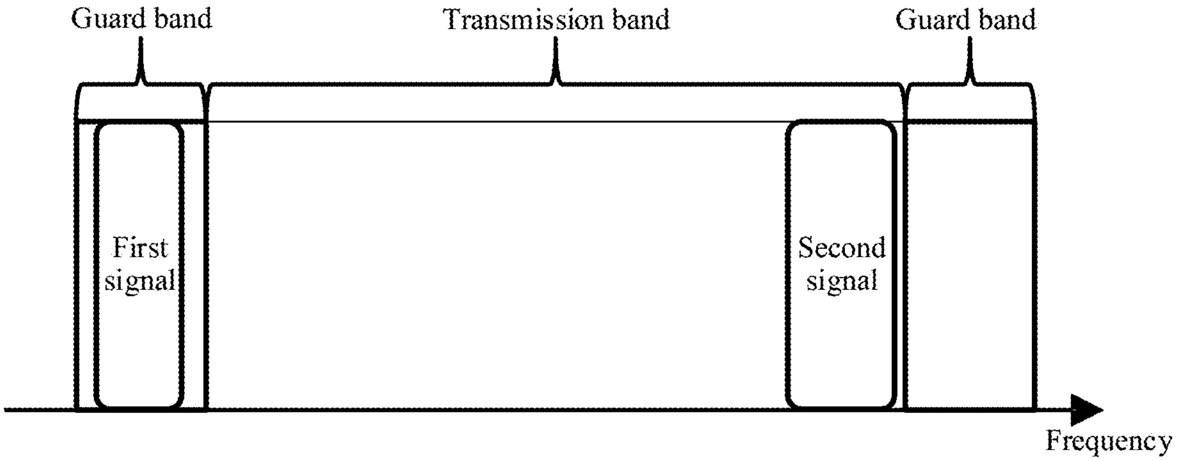
FIG. 18 is a diagram of positions of a first signal and a second signal on an NR carrier according to an embodiment of this application.

FIG. 18 is a diagram of positions of the first signal and the second signal on the NR carrier. In FIG. 18, an example in which the first frequency domain unit is located in the guard band of the NR carrier, and the second frequency domain unit is located in a transmission band of the NR carrier is used. In other words, the first signal is in the guard band of the NR carrier, and the second signal is in the transmission band of the NR carrier. For example, when the first signal is a carrier signal, the first signal may be in the guard band of the NR carrier. Alternatively, if the first signal is in the guard band of the NR carrier, it may be considered that the first signal is a carrier signal. Because the first signal is in the guard band of the NR carrier, transmission of the first signal does not affect transmission in the transmission band of the NR carrier.

Figure 19:
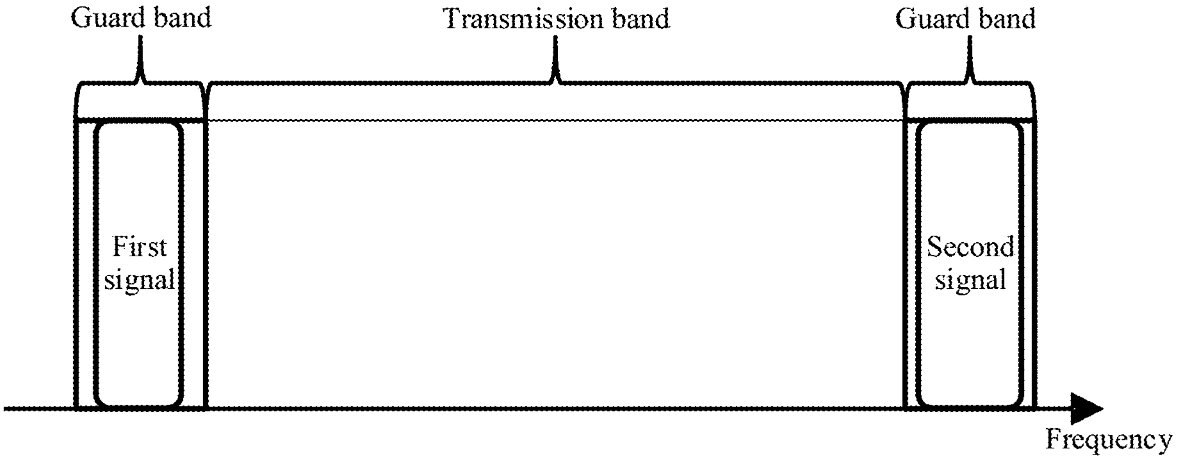
FIG. 19 is another diagram of positions of a first signal and a second signal on an NR carrier according to an embodiment of this application.

FIG. 19 is a diagram of positions of the first signal and the second signal on the NR carrier. In FIG. 19, an example in which the first frequency domain unit is located in one guard band of the NR carrier, and the second frequency domain unit is located in another guard band of the NR carrier is used. In other words, the first signal is in the guard band of the NR carrier, and the second signal is in the another guard band of the NR carrier. Because both the first signal and the second signal are in the guard bands of the NR carrier, transmission of the first signal and the second signal does not affect transmission in a transmission band of the NR carrier.

In a second case, both the first signal and the second signal are in a transmission bandwidth of the NR carrier, a difference between a minimum value of the first frequency domain unit and a lowest frequency of the transmission bandwidth is less than or equal to a first value, and a difference between a maximum value of the second frequency domain unit and a highest frequency of the transmission bandwidth is less than or equal to a second value. The first value may be 0, and the second value may also be 0. For example, the difference between the minimum value of the first frequency domain unit and the lowest frequency of the transmission bandwidth may be 0, and the difference between the maximum value of the second frequency domain unit and the highest frequency of the transmission bandwidth may be 0. When the first signal and the second signal are in the transmission bandwidth of the NR carrier, the first frequency domain unit and the second frequency domain unit may be respectively located at two ends of the transmission bandwidth of the NR carrier, to ensure anti-interference performance of the first signal and the second signal as much as possible. For ease of understanding, the following uses a figure as an example.

Figure 20:
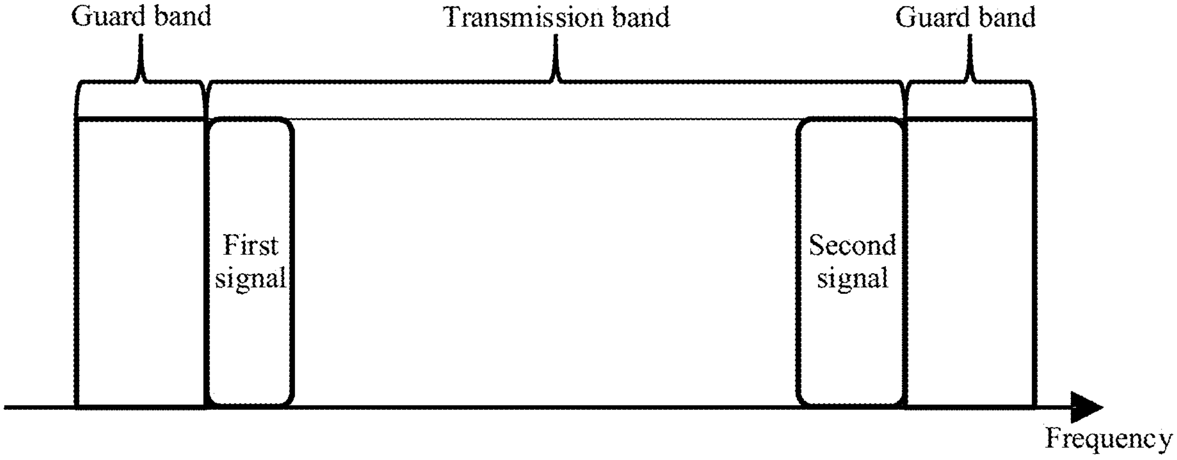
FIG. 20 is still another diagram of positions of a first signal and a second signal on an NR carrier according to an embodiment of this application.

FIG. 20 is a diagram of positions of the first signal and the second signal on the NR carrier. In FIG. 20, an example in which the first frequency domain unit is located at one end of a transmission band of the NR carrier, and the second frequency domain unit is located at the other end of the transmission band of the NR carrier is used. Because the first signal and the second signal are respectively at two ends of the NR carrier, and frequency positions of the first signal and the second signal are close to guard bands of the NR carrier, anti-interference performance of the first signal and the second signal can be ensured as much as possible.

Modulation schemes of the first signal and the second signal are not limited in this embodiment of this application. A modulation scheme of the first signal and/or a modulation scheme of the second signal are/is on-off keying, multicarrier on-off keying, double-sideband amplitude-shift keying, single-sideband amplitude-shift keying, phase-reversal amplitude shift keying, multiple amplitude-shift keying, frequency-shift keying, gauss frequency-shift keying, multiple frequency-shift keying, binary phase shift keying, quadrature phase shift keying, pulse amplitude modulation, pulse-width modulation, pulse position modulation, pulse density modulation, or pulse-code modulation. Modulation schemes of the first signal and the second signal may be the same or may be different.

In a possible implementation, an antenna port of the first signal is the same as an antenna port of the second signal. A cyclic prefix length of the first signal is the same as a cyclic prefix length of the second signal. A subcarrier spacing of the first signal is the same as a subcarrier spacing of the second signal. A waveform of the first signal and/or a waveform of the second signal are/is OFDM using a CP. A waveform of the first signal and/or a waveform of the second signal are/is OFDM using a CP, and DFT spreading is performed.

It may be understood that the first device may send the first signal at the first frequency, and send the second signal at the second frequency. In this way, the second device receives the first signal and the second signal through envelope detection, and can distinguish between a signal on a direct current carrier and the interference signal. However, interference dynamically changes. If the first device still sends the first signal at the first frequency and sends the second signal at the second frequency when there is no interference, resource overheads are clearly increased. Therefore, in this embodiment of this application, when there is no interference, the first device may alternatively send one signal at one frequency position, to reduce resource overheads. However, the second device does not know whether the first device sends two signals or one signal. If the first device sends two signals, and the second device receives the signals based on a case in which the first device sends one signal, receiving performance of the second device cannot be ensured. Similarly, if the first device sends one signal, and the second device receives the signal based on a case in which the first device sends two signals, receiving performance of the second device cannot be ensured.

Therefore, the first device may indicate a signal receiving manner to the second device, so that the first device and the second device have a consistent understanding of the signal receiving manner, to ensure the receiving performance of the second device.

S1403: The first device sends second indication information to the second device, and correspondingly, the second device receives the second indication information sent by the first device.

The second indication information may indicate a manner of receiving a signal by the second device. In this embodiment of this application, the manner of receiving the signal by the second device includes a first receiving manner and a second receiving manner. Correspondingly, the second indication information may indicate the second device to receive the signal in the first receiving manner or the second receiving manner.

The first receiving manner indicates to receive a signal based on the absolute value of the difference between the first frequency and the second frequency. The second receiving manner indicates to receive a signal based on a frequency of the direct current carrier and the absolute value of the difference between the first frequency and the second frequency. It may be understood that the first device sends the first signal and the second signal. For the second device, if there is an interference signal, the second device may receive a signal at a frequency position obtained by subtracting the second frequency from the first frequency. If there is no interference signal, in addition to receiving a signal at a frequency position obtained by subtracting the second frequency from the first frequency, the second device may further receive a low-frequency signal near the direct current carrier. Therefore, the first device may notify the second device of the signal receiving manner, to ensure the receiving performance of the second device as much as possible.

A specific implementation form of the second indication information is not limited in this embodiment of this application. For example, the second indication information may directly indicate the first receiving manner or the second receiving manner. For example, the second indication information is information with one bit. A value "0" of the bit indicates the first receiving manner, and correspondingly, a value "1" of the bit indicates the second receiving manner. Alternatively, a value "1" of the bit indicates the first receiving manner, and correspondingly, a value "0" of the bit indicates the second receiving manner.

For example, the second indication information may indirectly indicate the first receiving manner or the second receiving manner. For example, the second indication information may indicate a signal deployment mode, and the deployment mode includes transmission band deployment or guard band deployment. In the transmission band deployment, a signal is sent at a frequency of a transmission band.

In the guard band deployment, a signal is sent at a frequency of a guard band. If the signal deployment mode is the guard band deployment, it may be considered by default that the first device sends two signals, to indirectly indicate the second receiving manner. If the signal deployment mode is the transmission band deployment, it may be considered by default that the first device sends one signal, to indirectly indicate the first receiving manner. For another example, the second indication information may indicate a frequency difference. If the frequency difference satisfies a specific condition that the absolute value of the difference between the first frequency and the second frequency needs to satisfy, the second indication information indirectly indicates the second receiving manner. If the frequency difference does not satisfy a specific condition that the absolute value of the difference between the first frequency and the second frequency needs to satisfy, the second indication information indirectly indicates the first receiving manner.

For ease of understanding, the following shows the first receiving manner and the second receiving manner with reference to the accompanying drawings. In the following FIG. 21 and FIG. 22, an example in which a signal output by an envelope detector in the second device includes a direct current carrier component and an intermediate-frequency component is used, and a high-frequency component is not shown. For details, refer to related content of the foregoing envelope detection principle. Details are not described herein again.

Figure 21:
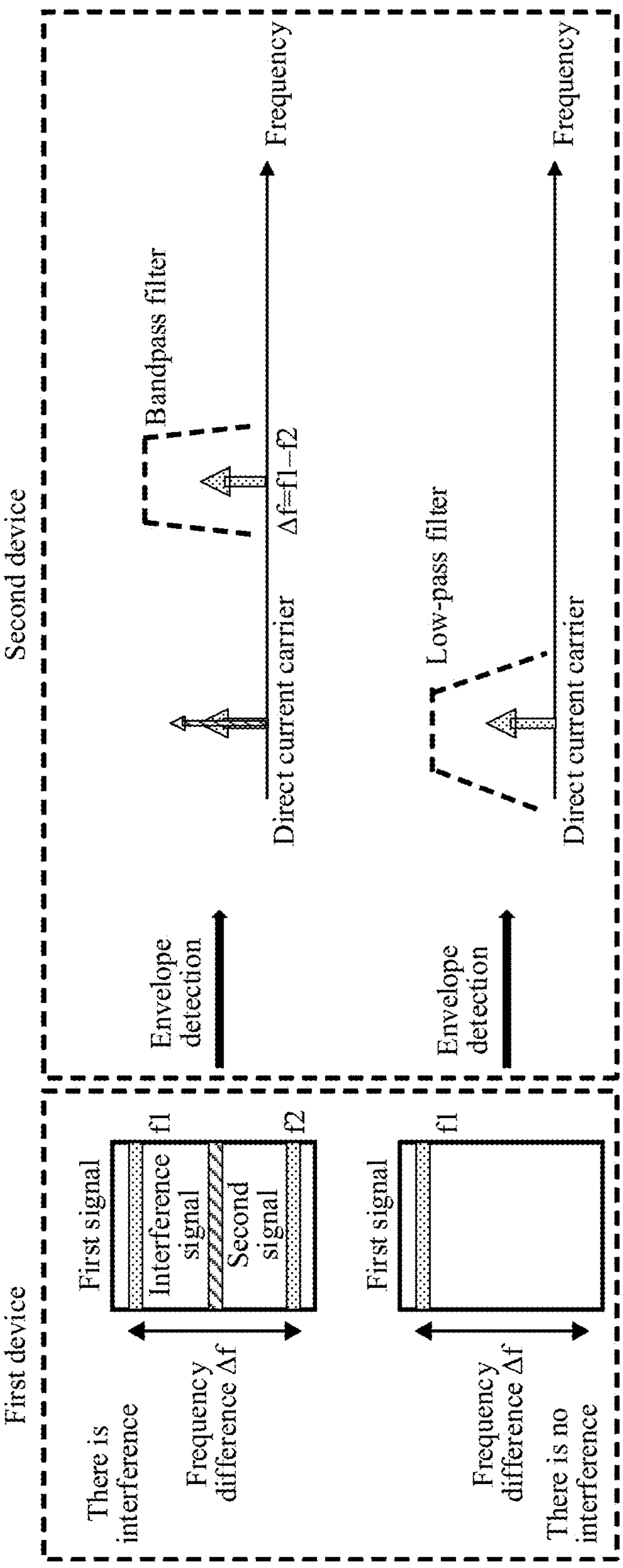
FIG. 21 is a diagram of sending a signal by a first device and receiving the signal by a second device according to an embodiment of this application.

FIG. 21 is a diagram of sending a signal by the first device and receiving the signal by the second device. In FIG. 21, an example in which the first device sends the first signal at f1 and sends the second signal at f2 when there is interference, and the first device sends the first signal at f1 when there is no interference is used. The second device receives the first signal and the second signal through envelope detection, and may obtain a signal, namely, a target signal, at a position of the frequency difference between the first frequency and the second frequency. It may also be understood as that a frequency that carries the target signal is the absolute value of the difference between the first frequency and the second frequency. When there is no interference, the signal received by the second device is near the direct current carrier. It can be seen from FIG. 21 that, when there is interference, an interference signal is near the direct current carrier. Therefore, the interference signal may be suppressed by using a bandpass filter. When there is no interference, a low-pass filter may be used for filtering.

Figure 22:
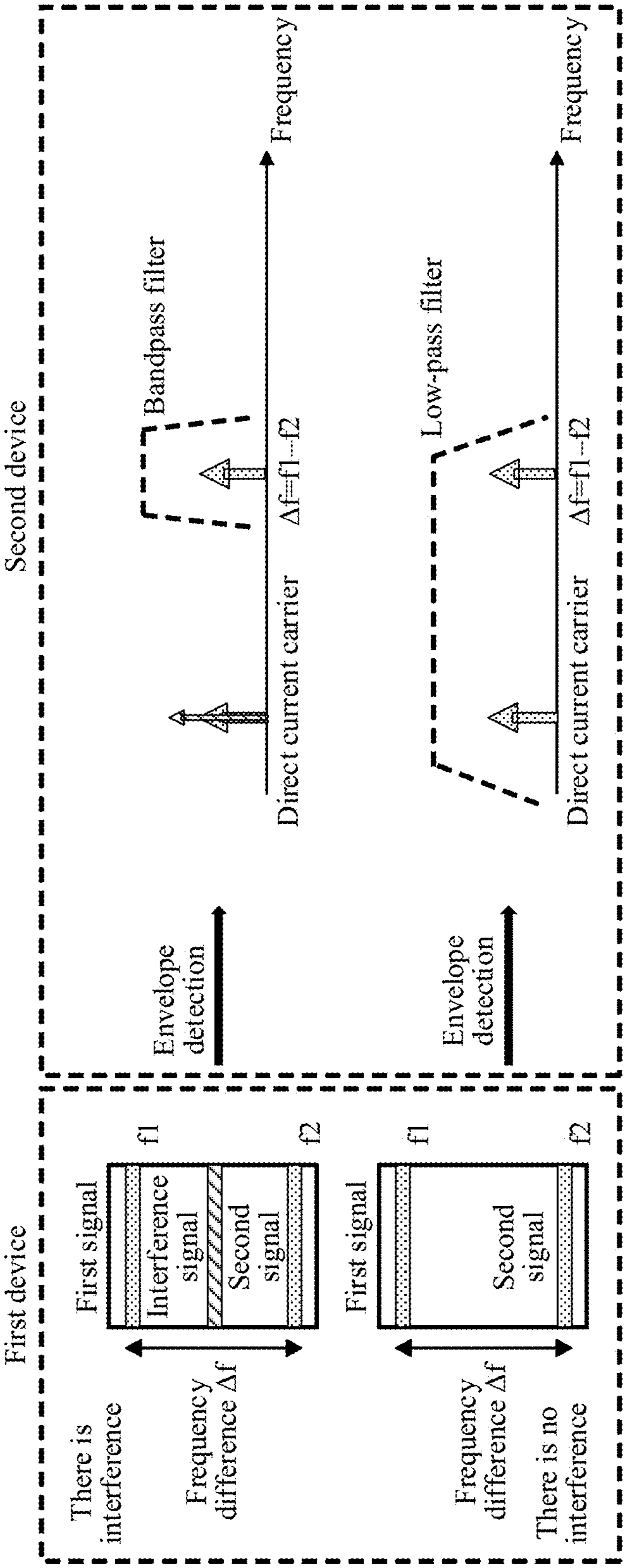
FIG. 22 is another diagram of sending a signal by a first device and receiving the signal by a second device according to an embodiment of this application.

FIG. 22 is another diagram of sending a signal by the first device and receiving the signal by the second device. In FIG. 22, an example in which the first device sends the first signal at f1 and sends the second signal at f2 when there is interference, and the first device sends the first signal at f1 and sends the second signal at f2 when there is no interference. Similar to FIG. 21, the second device receives the first signal and the second signal through envelope detection, and may obtain a signal, namely, a target signal, at a position of the frequency difference between the first frequency and the second frequency. When there is no interference, in addition to a signal near the direct current carrier, the signal received by the second device further includes the signal at the position of the frequency difference between the first frequency and the second frequency. It can be seen from FIG. 22 that, when there is interference, an interference signal is near the direct current carrier. Therefore, the interference signal may be suppressed by using a bandpass filter. When there is no interference, both a signal on the direct current carrier and a signal at Δf carry useful information. Therefore, the second device may receive the signal on the direct current carrier and the signal at Δf, and then perform filtering by using a low-pass filter, so that receiving performance of the first signal and the second signal can be ensured.

S1404: The second device receives the first signal and the second signal through envelope detection.

For how the second device receives the signal through envelope detection, refer to descriptions of the foregoing envelope detector principle. Details are not described herein again.

S1405: The second device obtains the target signal from the received signal.

The second device may receive signals at frequency positions based on the second indication information, or it may be considered that the second device may determine, based on the second indication information, a parameter of a filter to filter a signal output by the envelope detector, to obtain the target signal.

For a case in which there is interference, when the foregoing describes how to better suppress interference in this embodiment of this application, a solution of a filter after the envelope detector is described. Details are not described herein again. For a case in which there is no interference, the following describes how the second device receives the first signal and the second signal and obtains the target signal.

Assuming that there is no interference, an input signal x(t) of the envelope detector satisfies:

$$x(t) = x_{sig1}(t) + x_{sig2}(t)$$

$$x_{sig2}(t) = A_{sig1}(t) \times \cos(2\pi f_{c,sig1} t)$$

and $$x_{sig2}(t) = A_{sig2}(t) \times \cos(2\pi f_{c,sig2} t).$$

An output signal y(t) of the envelope detector satisfies:

$$y(t) = (x(t))^2 = (x_{sig1}(t) + x_{sig2}(t))^2$$

$x_{sig1}(t)$ and $x_{sig2}(t)$ is substituted into the foregoing formula, to obtain:

$$\begin{aligned} y(t) = {} & (A_{sig1}(t))^2 \times (1 + \cos(2\pi \times 2 f_{c,sig1} t))/2 + \\ & (A_{sig2}(t))^2 \times (1 + \cos(2\pi \times 2 f_{c,sig2} t))/2 + \\ & A_{sig1}(t) A_{sig2}(t) \times \cos(2\pi(f_{c,sig2} + f_{c,sig1})t) + \\ & A_{sig1}(t) A_{sig2}(t) \times \cos(2\pi(f_{c,sig2} - f_{c,sig1})t) \end{aligned}$$

$A_{sig1}(t)$ and $A_{sig2}(t)$ respectively represent the first signal and the second signal, and $f_{c,sig1}$ and $f_{c,sig2}$ respectively are carrier frequencies used for the first signal and the second signal. The output y(t) of the envelope detector includes high-frequency components whose frequencies are $2f_{c,sig1}$, $2f_{c,sig2}$, and $f_{c,sig2}+f_{c,sig1}$. After a low-pass filter performs filtering on y(t), the target signal $\tilde{y}(t)$ can be obtained, and $\tilde{y}(t)$ satisfies:

$$\tilde{y}(t) = (A_{sig1}(t))^2/2 + (A_{sig2}(t))^2/2 + A_{sig1}(t)A_{sig2}(t) \times \cos(2\pi(f_{c,sig2} - f_{c,sig1})t).$$

It may be understood that $A_{sig1}(t)A_{sig2}(t)\times\cos(2\pi(f_{c,sig2}-f_{c,sig1})t)$ is an intermediate-frequency component. To reduce processing complexity and power consumption, the second device may filter the intermediate-frequency component by using a bandpass filter, and then further perform down-conversion processing on the intermediate-frequency component that passes through the bandpass filter, to obtain a baseband signal. An implementation of down-conversion is not limited in embodiments of this application. For example, the second device may implement a down-conversion operation by using the envelope detector, or may implement the down-conversion operation by using a low-frequency crystal oscillator and a frequency mixer. For how to restore information carried by $A_{sig1}(t)$ and/or $A_{sig2}(t)$ after the down-conversion operation of the second device is performed, refer to related content of restoring the information carried by $A_{sig1}(t)$ and/or $A_{sig2}(t)$ when the down-conversion operation is implemented by using the envelope detector, or refer to related content of restoring the information carried by $A_{sig1}(t)$ and/or $A_{sig2}(t)$ when the down-conversion operation is implemented by using a low-frequency crystal oscillator and a frequency mixer. Details are not described herein again.

According to the solution provided in this embodiment of this application, a transmit end device may send two signals at two frequency positions, and a receive end device receives the two signals through envelope detection, without increasing the design and implementation complexity of the radio frequency filter. In addition, the intermediate-frequency component output by the envelope detector in the second device may be considered as a signal that the second device needs to obtain. When there is interference, the interference exists in the high-frequency component, and the intermediate-frequency component does not include the interference. Therefore, only the intermediate-frequency component passes through the intermediate-frequency filter, so that the signal on the direct current carrier and the interference signal can be distinguished. Because a frequency of an intermediate frequency is lower than a frequency of a radio frequency, the intermediate frequency filter is easier to be designed and implemented under a same Q value requirement. Therefore, according to the solution in this embodiment of this application, the target signal and the interference are easily distinguished by using the intermediate frequency filter after envelope detection is performed, and the design and implementation complexity of the radio frequency filter is not increased.

In embodiments provided in this application, the method provided in embodiments of this application is described separately from a perspective of interaction between a terminal device, an access network device, and a core network device. To implement the functions in the foregoing method provided in embodiments of this application, the terminal device, the access network device, and the core network device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

An embodiment of this application further provides a communication apparatus. The following describes, with reference to the accompanying drawings, communication apparatuses configured to implement the foregoing method in embodiments of this application.

Figure 23:
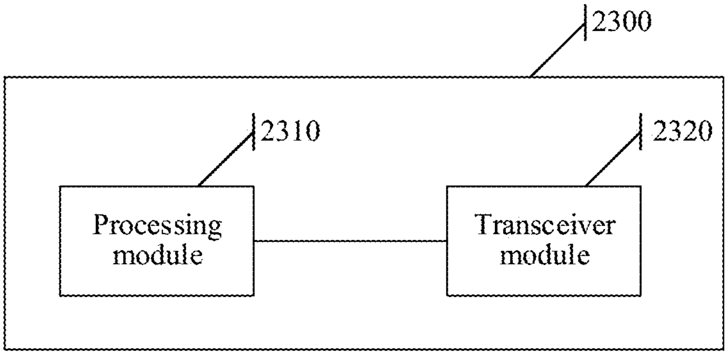
FIG. 23 is a diagram of a structure of a communication apparatus according to an embodiment of this application.

FIG. 23 is a block diagram of a communication apparatus 2300 according to an embodiment of this application. The communication apparatus 2300 may include a processing module 2310 and a transceiver module 2320. Optionally, a storage unit may be included. The storage unit may be configured to store instructions (code or a program) and/or data. The processing module 2310 and the transceiver module 2320 may be coupled to the storage unit. For example, the processing module 2310 may read the instructions (the code or the program) and/or the data in the storage unit, to implement a corresponding method. The foregoing modules may be disposed independently, or may be partially or completely integrated.

In some possible implementations, the communication apparatus 2300 can correspondingly implement behavior and functions of the first device in the foregoing method embodiments. The communication apparatus 2300 may be a first device, or may be a component (for example, a chip or a circuit) used in the first device, or may be a chip or a chip group in the first device, or a part that is of the chip and that is configured to perform a related method function. For example, the communication apparatus 2300 may perform steps such as S1401, S1402, and S1403 in FIG. 14.

For example, the processing module 2310 is configured to determine a first signal and a second signal. The transceiver module 2320 is configured to: send the first signal to a second device on a first frequency domain unit, and send the second signal on a second frequency domain unit. The first frequency domain unit includes a first frequency, and the second frequency domain unit includes a second frequency. An absolute value of a difference between the first frequency and the second frequency is related to one or more of the following: a first bandwidth, a second bandwidth, or a third bandwidth. The first bandwidth is a bandwidth occupied by the first frequency domain unit in frequency domain, and the second bandwidth is a bandwidth occupied by the second frequency domain unit in frequency domain. The third bandwidth is a bandwidth occupied by a third frequency domain unit in frequency domain, and the third frequency domain unit is used by the first device to send a third signal to a third device. The first signal, the second signal, and the third signal are in one operating band.

In an optional implementation, the transceiver module 2320 is further configured to send first indication information to the second device. The first indication information indicates the absolute value of the difference between the first frequency and the second frequency.

In an optional implementation, the transceiver module 2320 is further configured to send second indication information to the second device. The second indication information indicates the second device to receive a signal in a first receiving manner or a second receiving manner. The first receiving manner indicates to receive a signal based on the absolute value of the difference between the first frequency and the second frequency. The second receiving manner indicates to receive a signal based on a frequency of a direct current carrier and the absolute value of the difference between the first frequency and the second frequency.

For details, refer to related content in any embodiment in FIG. 14 to FIG. 22. Details are not described herein again.

For example, the processing module 2310 is configured to determine a first signal and a second signal. The transceiver module 2320 is configured to: send the first signal to a second device on a first frequency domain unit, and send the second signal on a second frequency domain unit. The first signal and the second signal are in one operating band. The first frequency domain unit includes a first frequency, and the second frequency domain unit includes a second frequency. An absolute value of a difference between the first frequency and the second frequency is a preset value. Alternatively, the transceiver module 2320 is further configured to send an absolute value of a difference between the first frequency and the second frequency to the second device.

In an optional implementation, the transceiver module 2320 is further configured to send second indication information to the second device. The second indication information indicates the second device to receive a signal in a first receiving manner or a second receiving manner. The first receiving manner indicates to receive a signal based on the absolute value of the difference between the first frequency and the second frequency. The second receiving manner indicates to receive a signal based on a frequency of a direct current carrier and the absolute value of the difference between the first frequency and the second frequency.

For details, refer to related content in any embodiment in FIG. 14 to FIG. 22. Details are not described herein again.

In some other possible implementations, the communication apparatus 2300 can correspondingly implement behavior and functions of the second device in the foregoing method embodiments. The communication apparatus 2300 may be a second device, or may be a component (for example, a chip or a circuit) used in the second device, or may be a chip or a chip group in the second device, or a part that is of the chip and that is configured to perform a related method function. For example, the communication apparatus 2300 may perform steps such as S1401, S1402, S1403, S1404, and S1405 in FIG. 14.

For example, the transceiver module 2320 is configured to receive a first signal and a second signal through envelope detection. The processing module 2310 is configured to obtain a target signal. A frequency that carries the target signal includes an absolute value of a difference between a first frequency that carries the first signal and a second frequency that carries the second signal. For another example, the transceiver module 2320 is configured to receive a first signal and a second signal through envelope detection. The processing module 2310 is configured to obtain a target signal. A frequency that carries the target signal includes an absolute value of a difference between a first frequency that carries the first signal and a second frequency that carries the second signal. The absolute value of the difference between the first frequency and the second frequency is a preset value, or the absolute value of the difference between the first frequency and the second frequency is obtained from a first device.

In an optional implementation, the processing module 2310 is further configured to determine a receiving manner used to obtain the target signal. The receiving manner includes a first receiving manner or a second receiving manner. The first receiving manner indicates to receive a signal based on the absolute value of the difference between the first frequency and the second frequency. The second receiving manner indicates to receive a signal based on a frequency of a direct current carrier and the absolute value of the difference between the first frequency and the second frequency.

In an optional implementation, the transceiver module 2320 is further configured to receive second indication information sent by the first device. The second indication information indicates the first receiving manner or the second receiving manner.

For details, refer to related content in any embodiment in FIG. 14 to FIG. 22. Details are not described herein again.

It should be understood that in this embodiment of this application, the processing module 2310 may be implemented by a processor or a processor-related circuit component, and the transceiver module 2320 may be implemented by a transceiver, a transceiver-related circuit component, or a communication interface.

Figure 24:
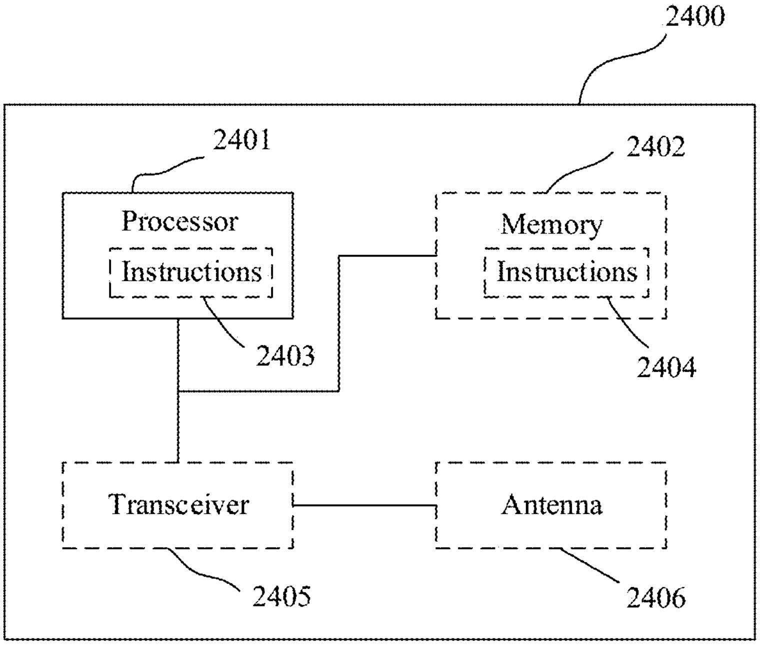
FIG. 24 is a diagram of another structure of a communication apparatus according to an embodiment of this application.

FIG. 24 is a block diagram of a communication apparatus 2400 according to an embodiment of this application. The communication apparatus 2400 may be a first device, and can implement functions of the first device in the method provided in embodiments of this application. Alternatively, the communication apparatus 2400 may be an apparatus that can support a first device in implementing a corresponding function in the method provided in embodiments of this application. The communication apparatus 2400 may be a chip system. In this embodiment of this application, the chip system may include a chip, or may include a chip and another discrete component. For a specific function, refer to the descriptions in the foregoing method embodiments. The communication apparatus 2400 may alternatively be a second device, and can implement functions of the second device in the method provided in embodiments of this application. Alternatively, the communication apparatus 2400 may be an apparatus that can support a second device in implementing a corresponding function in the method provided in embodiments of this application. The communication apparatus 2400 may be a chip system. In this embodiment of this application, the chip system may include a chip, or may include a chip and another discrete component. For a specific function, refer to the descriptions in the foregoing method embodiments.

The communication apparatus 2400 includes one or more processors 2401, configured to implement or support the communication apparatus 2400 in implementing functions of the first device in the method provided in embodiments of this application. For details, refer to detailed descriptions in the method example. Details are not described herein. The one or more processors 2401 may alternatively be configured to implement or support the communication apparatus 2400 in implementing functions of the second device in the method provided in embodiments of this application. For details, refer to detailed descriptions in the method example. Details are not described herein. The processor 2401 may also be referred to as a processing unit or a processing module, and may implement a specific control function. The processor 2401 may be a general-purpose processor, a dedicated processor, or the like. For example, the processor includes a central processing unit, an application processor, a modem processor, a graphics processor, an image signal processor, a digital signal processor, a video codec processor, a controller, a memory, a neural-network processor, and/or the like. The central processing unit may be configured to control the communication apparatus 2400, execute a software program, and/or process data. Different processors may be independent components, or may be integrated into one or more processors, for example, integrated into one or more application-specific integrated circuits.

Optionally, the communication apparatus 2400 includes one or more memories 2402, configured to store instructions 2404. The instructions may be run on the processor 2401, to enable the communication apparatus 2400 to perform the method described in the foregoing method embodiment. The memory 2402 and the processor 2401 may be separately disposed, or may be integrated, or it may be considered that the memory 2402 and the processor 2401 are coupled. The coupling in this embodiment of this application may be an indirect coupling or a communication connection between apparatuses, units, or modules in an electrical form, a mechanical form, or another form, and is used for information exchange between the apparatuses, the units, or the modules. The processor 2401 may operate in collaboration with the memory 2402. At least one of the at least one memory may be included in the processor. It should be noted that the memory 2402 is not mandatory, and therefore is shown by using a dashed line in FIG. 24.

Optionally, the memory 2402 may further store data. The processor and the memory may be separately disposed, or may be integrated together. In this embodiment of this application, the memory 2402 may be a non-volatile memory, for example, a hard disk drive (HDD) or a solid-state drive (SSD), or may be a volatile memory, for example, a random access memory (RAM). The memory is any other medium that can carry or store expected program code in a form of instructions or a data structure and that can be accessed by a computer, but is not limited thereto. The memory in embodiments of this application may alternatively be a circuit or any other apparatus that can implement a storage function, and is configured to store program instructions and/or data.

Optionally, the communication apparatus 2400 may include instructions 2403 (which may also be referred to as code or programs sometimes), and the instructions 2403 may be run on the processor, to enable the communication apparatus 2400 to perform the method described in the foregoing embodiments. The processor 2401 may store data.

Optionally, the communication apparatus 2400 may further include a transceiver 2405 and/or an antenna 2406. The transceiver 2405 may be referred to as a transceiver unit, a transceiver module, a transceiver machine, a transceiver circuit, a transceiver, an input/output interface, or the like, and is configured to implement a transceiver function of the communication apparatus 2400 via the antenna 2406.

The processor 2401 and the transceiver 2405 that are described in this application may be implemented on an integrated circuit (IC), an analog IC, a radio frequency integrated circuit (RFID), a mixed signal IC, an ASIC, a printed circuit board (PCB), an electronic device, or the like. The communication apparatus described in this specification may be implemented by an independent device (for example, an independent integrated circuit or a mobile phone), or may be a part (for example, a module that may be embedded in another device) of a large device. For details, refer to the foregoing descriptions of the terminal device and the network device. Details are not described herein again.

In a possible implementation, the communication apparatus 2400 can correspondingly implement behavior and functions of the first device in the foregoing method embodiments. The communication apparatus 2400 may be a first device, or may be a component (for example, a chip or a circuit) used in a first device, or may be a chip or a chip group in a first device, or a part of a chip that is configured to perform a related method function. For example, the communication apparatus 2400 may perform steps such as S1401, S1402, and S1403 in FIG. 14.

For example, the processor 2401 is configured to determine a first signal and a second signal. The transceiver 2405 is configured to: send the first signal to a second device on a first frequency domain unit, and send the second signal on a second frequency domain unit. The first frequency domain unit includes a first frequency, and the second frequency domain unit includes a second frequency. An absolute value of a difference between the first frequency and the second frequency is related to one or more of the following: a first bandwidth, a second bandwidth, or a third bandwidth. The first bandwidth is a bandwidth occupied by the first frequency domain unit in frequency domain, and the second bandwidth is a bandwidth occupied by the second frequency domain unit in frequency domain. The third bandwidth is a bandwidth occupied by a third frequency domain unit in frequency domain, and the third frequency domain unit is used by the first device to send a third signal to a third device. The first signal, the second signal, and the third signal are in one operating band.

In an optional implementation, the transceiver 2405 is further configured to send first indication information to the second device. The first indication information indicates the absolute value of the difference between the first frequency and the second frequency.

In an optional implementation, the transceiver 2405 is further configured to send second indication information to the second device. The second indication information indicates the second device to receive a signal in a first receiving manner or a second receiving manner. The first receiving manner indicates to receive a signal based on the absolute value of the difference between the first frequency and the second frequency. The second receiving manner indicates to receive a signal based on a frequency of a direct current carrier and the absolute value of the difference between the first frequency and the second frequency.

For details, refer to related content in any embodiment in FIG. 14 to FIG. 22. Details are not described herein again.

For example, the processor 2401 is configured to determine a first signal and a second signal. The transceiver 2405 is configured to send: the first signal to a second device on a first frequency domain unit, and send the second signal on a second frequency domain unit. The first signal and the second signal are in one operating band. The first frequency domain unit includes a first frequency, and the second frequency domain unit includes a second frequency. An absolute value of a difference between the first frequency and the second frequency is a preset value. Alternatively, the transceiver 2405 is further configured to send the absolute value of the difference between the first frequency and the second frequency to the second device.

In an optional implementation, the transceiver 2405 is further configured to send second indication information to the second device. The second indication information indicates the second device to receive a signal in a first receiving manner or a second receiving manner. The first receiving manner indicates to receive a signal based on the absolute value of the difference between the first frequency and the second frequency. The second receiving manner indicates to receive a signal based on a frequency of a direct current carrier and the absolute value of the difference between the first frequency and the second frequency.

For details, refer to related content in any embodiment in FIG. 14 to FIG. 22. Details are not described herein again.

In some other possible implementations, the communication apparatus 2400 can correspondingly implement behavior and functions of the second device in the foregoing method embodiments. The communication apparatus 2400 may be a second device, or may be a component (for example, a chip or a circuit) used in a second device, or may be a chip or a chip group in a second device, or a part of a chip that is configured to perform a related method function. For example, the communication apparatus 2400 may perform steps such as S1401, S1402, S1403, S1404, and S1405 in FIG. 14.

For example, the transceiver 2405 is configured to receive a first signal and a second signal through envelope detection. The processing module 2310 is configured to obtain a target signal. A frequency that carries the target signal includes an absolute value of a difference between a first frequency that carries the first signal and a second frequency that carries the second signal. For another example, the transceiver 2405 is configured to receive a first signal and a second signal through envelope detection. The processor 2401 is configured to obtain a target signal. A frequency that carries the target signal includes an absolute value of a difference between a first frequency that carries the first signal and a second frequency that carries the second signal. The absolute value of the difference between the first frequency and the second frequency is a preset value, or the absolute value of the difference between the first frequency and the second frequency is obtained from a first device.

In an optional implementation, the processor 2401 is further configured to determine a receiving manner used to obtain the target signal. The receiving manner includes a first receiving manner or a second receiving manner. The first receiving manner indicates to receive a signal based on the absolute value of the difference between the first frequency and the second frequency. The second receiving manner indicates to receive a signal based on a frequency of a direct current carrier and the absolute value of the difference between the first frequency and the second frequency.

In an optional implementation, the transceiver 2405 is further configured to receive second indication information sent by the first device. The second indication information indicates the first receiving manner or the second receiving manner.

For details, refer to related content in any embodiment in FIG. 14 to FIG. 22. Details are not described herein again.

Optionally, the communication apparatus 2400 may further include one or more of the following components: a wireless communication module, an audio module, an external memory interface, an internal memory, a universal serial bus (USB) interface, a power management module, an antenna, a speaker, a microphone, an input/output module, a sensor module, a motor, a camera, a display, or the like. It may be understood that, in some embodiments, the communication apparatus 2400 may include more or fewer components, or some components may be integrated, or some components may be split. The components may be implemented by hardware, software, or a combination of software and hardware.

It should be noted that the communication apparatus in the foregoing embodiments may be a terminal device (or a network device), may be a circuit, may be a chip used in a terminal device (or a network device), or may be another combined device, component, or the like that has a function of a terminal (or a network device). When the communication apparatus is the terminal device (or the network device), the transceiver module may be a transceiver, and may include an antenna, a radio frequency circuit, and the like, and the processing module may be a processor, for example, a central processing module (CPU). When the communication apparatus is a component having a function of the terminal device (or the network device), the transceiver module may be a radio frequency unit, and the processing module may be a processor. When the communication apparatus is a chip system, the communication apparatus may be a field programmable gate array (FPGA), an application-specific integrated circuit (ASIC), a system-on-a-chip (SoC), a CPU, a network processor (NP), a digital signal processing circuit (digital signal processor, DSP), a microcontroller (micro controller unit, MCU), a programmable controller (programmable logic device, PLD), or another integrated chip. The processing module may be a processor of the chip system. The transceiver module or a communication interface may be an input/output interface or an interface circuit of the chip system. For example, the interface circuit may be a code/data read/write interface circuit. The interface circuit may be configured to receive code instructions (where the code instructions are stored in the memory, and may be directly read from the memory, or may be read from the memory through another device) and transmit the code instructions to the processor. The processor may be configured to run the code instructions to perform the method in the foregoing method embodiments. For another example, the interface circuit may alternatively be a signal transmission interface circuit between a communication processor and a transceiver machine.

When the communication apparatus is a chip-type apparatus or circuit, the apparatus may include a transceiver unit and a processing unit. The transceiver unit may be an input/output circuit and/or a communication interface. The processing unit is an integrated processor, a microprocessor, or an integrated circuit.

An embodiment of this application further provides a communication system. Specifically, the communication system includes at least one first device and at least one second device. For example, the communication system includes the first device and the second device that are configured to implement related functions in any one or more of FIG. 14 to FIG. 22. For details, refer to related descriptions in the method embodiments. Details are not described herein again.

An embodiment of this application further provides a computer-readable storage medium, including instructions; and when the instructions are run on a computer, the computer is enabled to perform the method performed by the first device in FIG. 14. Alternatively, when the instructions are run on a computer, the computer is enabled to perform the method performed by the second device in FIG. 14.

An embodiment of this application further provides a computer program product, including instructions; and when the instructions are run on a computer, the computer is enabled to perform the method performed by the first device in FIG. 14. Alternatively, when the instructions are run on a computer, the computer is enabled to perform the method performed by the second device in FIG. 14.

An embodiment of this application provides a chip system. The chip system includes a processor, and may further include a memory, configured to implement the function of the first device in the foregoing method, or configured to implement the function of the second device in the foregoing method. The chip system may include a chip, or may include a chip and another discrete device.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that illustrative logical blocks and steps described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be implemented in an electronic form, a mechanical form, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of embodiments.

When the functions are implemented in a form of a software functional unit and sold or used as an independent product, the functions may be stored in a computer-readable storage medium. Based on this understanding, a part that essentially contributes to the technical solutions of this application or a part of the technical solutions may be embodied in a form of a software product. The computer software product is stored in a storage medium, and includes several instructions for enabling a computer device (which may be a personal computer, a server, a network device, or the like) to perform all or some steps of the methods in embodiments of this application. The foregoing storage medium includes any medium, for example, a USB flash drive, a removable hard disk drive, a read-only memory (ROM), a RAM, a magnetic disk, or an optical disc, that can store program code.

It is clear that a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A method, comprising:

determining, by a first device, a first signal and a second signal;

sending, by the first device, the first signal to a second device on a first frequency domain unit comprising a first segment of one or more contiguous frequency domain resources, and sending the second signal on a second frequency domain unit comprising a second segment of one or more contiguous frequency domain resources, wherein the first frequency domain unit comprises a first frequency domain resource at a first frequency, the second frequency domain unit comprises a second frequency domain resource at a second frequency, and an absolute value of a difference between the first frequency and the second frequency is related to one or more of the following: a first bandwidth, a second bandwidth, or a third bandwidth, wherein the first bandwidth is a bandwidth occupied by the first frequency domain unit in a frequency domain, the second bandwidth is a bandwidth occupied by the second frequency domain unit in the frequency domain, the third bandwidth is a bandwidth occupied by a third frequency domain unit in the frequency domain, the third frequency domain unit is useable by the first device to send a third signal to a third device, and the first signal, the second signal, and the third signal are in one operating band; and sending, by the first device, first indication information to the second device, wherein the first indication information indicates the absolute value.

2. The method according to claim 1, wherein the first device sends the first signal and the second signal within a frequency range corresponding to a channel bandwidth of the second device, and the absolute value of the difference between the first frequency and the second frequency is greater than or equal to ½ of the channel bandwidth of the second device.

3. The method according to claim 1, wherein the absolute value of the difference between the first frequency and the second frequency is greater than or equal to a sum of the third bandwidth and a fourth bandwidth, the fourth bandwidth is twice a sum of the first bandwidth and the second bandwidth, and the third signal falls between the first frequency and the second frequency in the frequency domain.

4. The method according to claim 1, wherein the absolute value of the difference between the first frequency and the second frequency is a preset value, and the preset value is related to one or more of the following: the operating band, a subcarrier spacing of the first signal, or a subcarrier spacing of the second signal.

5. A method, comprising:

receiving, by a second device, a first signal and a second signal through envelope detection, wherein the first signal and the second signal are in one operating band;

receiving, by the second device, first indication information, wherein the first indication information indicates an absolute value of a difference between a first frequency of a frequency domain resource that carries the first signal and a second frequency of a frequency domain resource that carries the second signal; and obtaining, by the second device, a target signal, wherein a frequency of a frequency domain resource that carries the target signal is a frequency domain resource at a frequency that is the absolute value.

6. The method according to claim 5, wherein the frequency of the frequency domain resource that carries the target signal further comprises a frequency of a direct current carrier.

7. The method according to claim 5, further comprising:

determining, by the second device prior to obtaining the target signal, a receiving manner used to obtain the target signal, wherein the receiving manner comprises a first receiving manner or a second receiving manner, the first receiving manner indicates to receive a signal based on the absolute value of the difference between the first frequency and the second frequency, and the second receiving manner indicates to receive a signal based on the frequency of a direct current carrier and the absolute value of the difference between the first frequency and the second frequency.

8. The method according to claim 7, wherein the determining, by the second device, the receiving manner used to obtain the target signal comprises:

receiving, by the second device, second indication information sent by a first device, wherein the second indication information indicates the first receiving manner or the second receiving manner.

9. The method according to claim 5, wherein the absolute value of the difference between the first frequency and the second frequency is related to one or more of the following: a first bandwidth, a second bandwidth, or a third bandwidth, wherein the first bandwidth is a bandwidth occupied by a first frequency domain unit in a frequency domain, the first frequency domain unit comprises a first segment of one or more contiguous frequency domain resources at the first frequency, the second bandwidth is a bandwidth occupied by a second frequency domain unit in the frequency domain, the second frequency domain unit comprises a second segment of one or more contiguous frequency domain resources at the second frequency, the third bandwidth is a bandwidth occupied by a third frequency domain unit in the frequency domain, the third frequency domain unit is useable by a first device to send a third signal to a third device, and the third signal is in the operating band.

10. A first communication apparatus, comprising:

at least one processor; and a memory coupled to the at least one processor and having program instructions stored thereon which, when executed by the at least one processor, cause the first communication apparatus to:

determine a first signal and a second signal;

send the first signal to a second communication apparatus on a first frequency domain unit comprising a first segment of one or more contiguous frequency domain resources, and send the second signal on a second frequency domain unit comprising a second segment of one or more contiguous frequency domain resources, wherein the first frequency domain unit comprises a first frequency domain resource at a first frequency, the second frequency domain unit comprises a second frequency domain resource at a second frequency, and an absolute value of a difference between the first frequency and the second frequency is related to one or more of the following: a first bandwidth, a second bandwidth, or a third bandwidth, wherein the first bandwidth is a bandwidth occupied by the first frequency domain unit in a frequency domain, the second bandwidth is a bandwidth occupied by the second frequency domain unit in the frequency domain, the third bandwidth is a bandwidth occupied by a third frequency domain unit in the frequency domain, the third frequency domain unit is useable by the first communication apparatus to send a third signal to a third communication apparatus, and the first signal, the second signal, and the third signal are in one operating band; and send first indication information to the second communication apparatus, wherein the first indication information indicates the absolute value.

11. The first communication apparatus according to claim 10, wherein the first signal and the second signal is sent within a frequency range corresponding to a channel bandwidth of the second communication apparatus, and the absolute value of the difference between the first frequency and the second frequency is greater than or equal to ½ of the channel bandwidth of the second communication apparatus.

12. The first communication apparatus according to claim 10, wherein the absolute value of the difference between the first frequency and the second frequency is greater than or equal to a sum of the third bandwidth and a fourth bandwidth, the fourth bandwidth is twice a sum of the first bandwidth and the second bandwidth, and the third signal falls between the first frequency and the second frequency in the frequency domain.

13. The first communication apparatus according to claim 10, wherein the absolute value of the difference between the first frequency and the second frequency is a preset value, and the preset value is related to one or more of the following: the operating band, a subcarrier spacing of the first signal, or a subcarrier spacing of the second signal.

14. A communication apparatus, comprising:

at least one processor; and a memory coupled to the at least one processor and having program instructions stored thereon which, when executed by the at least one processor, cause the communication apparatus to:

receive a first signal and a second signal through envelope detection, wherein the first signal and the second signal are in one operating band;

receive first indication information, wherein the first indication information indicates an absolute value of a difference between a first frequency of a frequency domain resource that carries the first signal and a second frequency of a frequency domain resource that carries the second signal; and obtain a target signal, wherein a frequency of a frequency domain resource that carries the target signal is a frequency domain resource at a frequency that is the absolute value.

15. The communication apparatus according to claim 14, wherein the frequency of a frequency domain resource that carries the target signal further comprises a frequency of a direct current carrier.

16. The communication apparatus according to claim 14, wherein program instructions further cause the communication apparatus to:

determine a receiving manner used to obtain the target signal, wherein the receiving manner comprises a first receiving manner or a second receiving manner, the first receiving manner indicates to receive a signal based on the absolute value of the difference between the first frequency and the second frequency, and the second receiving manner indicates to receive a signal based on the frequency of a direct current carrier and the absolute value of the difference between the first frequency and the second frequency.

17. The communication apparatus according to claim 16, wherein program instructions cause the communication apparatus to:

receive second indication information from another communication apparatus, wherein the second indication information indicates the first receiving manner or the second receiving manner.

18. The communication apparatus according to claim 14, wherein the absolute value of the difference between the first frequency and the second frequency is related to one or more of the following: a first bandwidth, a second bandwidth, or a third bandwidth, wherein the first bandwidth is a bandwidth occupied by a first frequency domain unit in a frequency domain, the first frequency domain unit comprises the first frequency, the second bandwidth is a bandwidth occupied by a second frequency domain unit in the frequency domain, the second frequency domain unit comprises the second frequency, the third bandwidth is a bandwidth occupied by a third frequency domain unit in the frequency domain, the third frequency domain unit is useable by a first communication apparatus to send a third signal to a third communication apparatus, and the third signal is in the operating band.

* * * * *